US011408374B1

(12) United States Patent
Beck et al.

(10) Patent No.: US 11,408,374 B1
(45) Date of Patent: *Aug. 9, 2022

(54) JETTISONABLE BATTERY SYSTEMS FOR POWERING ELECTRICAL TURBOPUMPS FOR LAUNCH VEHICLE ROCKET ENGINE SYSTEMS

(71) Applicant: Rocket Lab USA, Inc., Los Angeles, CA (US)

(72) Inventors: Peter Joseph Beck, Auckland (NZ); Naomi Altman, Auckland (NZ); Jarrod William Burton, Auckland (NZ); Shaun Keith O'Donnell, Auckland (NZ)

(73) Assignee: Rocket Labs USA, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/833,366

(22) Filed: Mar. 27, 2020

Related U.S. Application Data

(62) Division of application No. 15/192,251, filed on Jun. 24, 2016.

(Continued)

(51) Int. Cl.
*F02K 9/46* (2006.01)
*H01M 8/18* (2006.01)
(Continued)

(52) U.S. Cl.
CPC ............ *F02K 9/46* (2013.01); *H01M 6/5044* (2013.01); *H01M 8/188* (2013.01); *H01M 8/20* (2013.01); *F02K 9/563* (2013.01); *H01M 2220/20* (2013.01)

(58) Field of Classification Search
CPC ........................................................ F02K 9/46
See application file for complete search history.

(56) References Cited

U.S. PATENT DOCUMENTS 3,262,351 A * 7/1966 Webb .................. F16B 37/0864
411/434
3,996,064 A 12/1976 Thaller
(Continued)

FOREIGN PATENT DOCUMENTS

WO WO2013/024361 A2 2/2013

OTHER PUBLICATIONS

Braff, William A., "Membraneless hydrogen bromine laminar flow battery for large-scale energy storage," Doctoral Thesis, Dept. of Mechanical Engineering, MIT, Dec. 19, 2013 (163 pages).
(Continued)

*Primary Examiner* — Lorne E Meade
(74) *Attorney, Agent, or Firm* — Weaver Austin Villeneuve & Sampson LLP

(57) ABSTRACT

Disclosed herein are various technologies pertinent to jettisonable battery systems for use in rocket engine-based launch vehicles. Such systems may feature battery units that are configured to be used to power one or more electric turbopumps that may be used to supply fuel to a rocket engine or engines. One or more of the battery units may be jettisoned during flight in order to reduce weight and as they are depleted. In some implementations, the battery units may be connected in parallel with the turbopump(s), with a depleted battery unit being electrically disconnected from the parallel circuit and jettisoned.

19 Claims, 13 Drawing Sheets

Related U.S. Application Data

(60) Provisional application No. 62/185,264, filed on Jun. 26, 2015.

(51) Int. Cl.
   *H01M 6/50* (2006.01)
   *H01M 8/20* (2006.01)
   *F02K 9/56* (2006.01)

(56) References Cited

U.S. PATENT DOCUMENTS

| | | | |
|---|---|---|---|
| 5,531,067 A | 7/1996 | Koppel | |
| 6,457,306 B1 * | 10/2002 | Abel | B64G 1/401 |
| | | | 417/16 |
| 7,389,636 B2 | 6/2008 | Fowler | |
| 9,340,299 B2 * | 5/2016 | Yates | B64D 27/24 |
| 9,650,138 B2 * | 5/2017 | Yates | B64D 39/00 |
| 9,677,503 B2 * | 6/2017 | Bahn | B64G 1/52 |
| 10,738,739 B2 * | 8/2020 | Bahn | B64G 1/40 |
| 2002/0171011 A1 | 11/2002 | Lopata et al. | |
| 2014/0083081 A1 | 3/2014 | Bahn | |
| 2014/0260186 A1 | 9/2014 | Bahn et al. | |
| 2014/0339371 A1 * | 11/2014 | Yates | B64D 27/24 |
| | | | 244/53 R |
| 2015/0027102 A1 | 1/2015 | Bahn et al. | |

OTHER PUBLICATIONS

Ding, et al., "Vanadium Flow Battery for Energy Storage: Prospects and Challenges," Journal of Physical Chemistry Letters, 2013, pp. 1281-1294. (Year: 2013).

"Mass ratio" Webpage [https://en.wikipedia.org/wiki/Mass_ratio accessed on Dec. 4, 2020] (Year: 2020).

"Tsiolkovsky Rocket Equation" Webpage [https://en.wikipedia.org/wiki/Tsiolkovsky_rocket_equation accessed on Dec. 4, 2020] (Year: 2020).

"Vanadium Redox Battery" Webpage [https://en.wikipedia.org/wiki/Vanadium_redox_battery accessed on Dec. 4, 2020] (Year: 2020).

U.S. Appl. No. 15/192,251, filed Jun. 24, 2016, Beck et al.
U.S. Appl. No. 16/833,373, filed Mar. 27, 2020, Beck et al.
U.S. Office Action dated Aug. 24, 2020, in U.S. Appl. No. 15/192,251.
U.S. Final Office Action dated Apr. 6, 2021, in U.S. Appl. No. 15/192,251.
U.S. Final Office Action dated Oct. 15, 2021, in U.S. Appl. No. 15/192,251.
U.S. Office Action dated Dec. 10, 2020, in U.S. Appl. No. 16/833,373.
U.S. Final Office Action dated Mar. 29, 2021, in U.S. Appl. No. 16/833,373.

* cited by examiner

JETTISONABLE BATTERY SYSTEMS FOR POWERING ELECTRICAL TURBOPUMPS FOR LAUNCH VEHICLE ROCKET ENGINE SYSTEMS

CROSS-REFERENCE TO RELATED APPLICATIONS

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

The present disclosure relates to rocket engines that are provided propellants by way of one or more electric turbopumps. More specifically, this disclosure is directed at such systems where the turbopumps are driven by one or more batteries, the mass of which may be ejected either periodically or continuously during flight of the rocket.

DESCRIPTION OF RELATED TECHNOLOGY

As discussed above, the present disclosure relates to liquid propellant rocket engines powered by electric turbopumps. Traditionally, one or more gas-driven turbopumps have been used to supply propellants to the injector and/or the regenerative cooling system of a rocket engine. Such turbopumps have been gas-driven, e.g., powered by expanding gas or pressurized gas systems that drive a turbine that, in turn, drives the turbopump impeller. Turbopumps typically reach speeds of 20,000 rpm to over 60,000 rpm, and present unique design challenges not found in lower speed, conventional pumps.

Rockets have also typically carried one or more batteries to provide power for the limited duration of the vehicle's flight. Thermal batteries, such as silver zinc or lithium oxyhalide batteries, have commonly been used to provide power to various onboard systems, such as guidance, navigation, engine control, communications, etc. Such batteries, however, have not been able to provide sufficient energy densities or sufficient discharge currents throughout the flight duration to make the use of an electric turbopump in a rocket engine feasible.

Definitions

Turbopump—a pump for transferring rocket propellants into a thrust chamber for combustion. The term "turbopump" is typically used to describe a turbine that powers a pump for rocketry applications. The term "electric turbopump" used herein refers to a pump that is driven by an electric motor. The electric motor is supplied with electric power that is either stored in a single or multiple batteries or generated on-board using an electric generator.

Jettison/Jettisoned—the process of removing mass from a launch vehicle during flight by ejecting objects or substances from the vehicle or by expelling substances into the combustion chamber of the rocket engine(s).

Payload—the mass of the object that is to be flown into a specific orbit using a launch vehicle.

Inert Mass—the dry mass of a launch vehicle, disregarding the mass of the propellants or the payload.

Battery Cell(s), Unit(s) and Pack(s)—devices that store electrochemical energy. The electrical energy is typically released by an electrochemical reaction in the battery cells. A battery unit includes one or more individual battery or fuel cell(s). Battery units may be connected together, either in parallel or in series, to form a battery pack. At least one battery unit is required to form a battery pack for the purpose of the descriptions given in this disclosure. The electric energy stored in the battery cells, units and packs is used to drive electrical components such as electric turbopumps on the vehicle. The vehicle can carry any number of battery units and battery packs onboard. The term "proper subset" is used in this disclosure to describe a group of battery units that form a battery pack. The terms "battery cells", "battery units" and "battery packs" are used in this disclosure to identify cells, units and packs of any electrochemical system, may it be a battery, a fuel cell or any other form of electrochemical system that either generates or stores electrical energy.

Launch Vehicle—a vehicle for launching a payload into space. A launch vehicle includes one or more rocket engines. The term may be used to refer to a multi-stage rocket, a single stage of a multi-stage rocket, or to a single-stage rocket. The term "rocket" may also be used to refer to the launch vehicle.

Flow Battery—an electrochemical system requiring periodic or continuous supply of at least one fluidic component to generate/extract electric power. The electrochemical reaction chamber of the flow battery is also referred to as "cell" in this disclosure. The fluidic component is provided to the cell from a storage tank and is discharged from the cell after contributing to the electrochemical reaction in the cell. At least one fluidic component is present in a flow battery. A fluidic component is a substance with a viscosity low enough to allow for fluid motion in the presence of a pressure gradient. In some contexts, a flow battery is considered a rechargeable fuel cell. For the context of this disclosure, a flow battery does not have to be rechargeable, but can be a single-use type battery or fuel cell where the fluidic component(s) is/are irreversibly changed during the electrochemical reaction in the cell. In some cases, the fluidic component(s) is/are "electrolyte(s)."

SUMMARY

One of the biggest challenges in developing low-cost, yet highly efficient launch vehicles is the minimization of the vehicle's mass and the maximization of the specific impulse. Electric turbopumps can be made at relatively low cost, run at high (electro-mechanical) conversion efficiencies of typically greater than 60% and can provide power-densities that are greater than those of their traditional, gas-driven counterparts. The electrical energy-densities of existing battery systems required to power electric turbopumps, however, are still relatively low when compared to the chemical energy-densities of readily available chemical propellants. Modern Li-Ion batteries feature electrical energy densities of the order of 1 MJ/kg which is high compared to other more traditional batteries but still comparatively low when directly comparing to the chemical energy densities of typical propellant combinations such as kerosene/LOX, with approximately 10 MJ/kg. Despite the fact that traditional gas-driven turbopumps feature fairly low (chemical-mechanical) conversion efficiencies, they are often the best choice when analyzing overall system efficiencies between competing electric and traditional gas-driven turbopump solutions for rocket engines. One realization is that a discharged battery can either be ejected at some point(s) along the vehicle's trajectory and/or partly be used as a fuel in combination with the vehicle's main oxidizer to generate thrust in the vehicle's rocket engine(s). The overall efficiency of such a system can be further optimized when the electrical energy required for a vehicle's electric turbopump system is stored in separate fluidic component(s) or even in the vehicle's main propellant(s). In either case, the electrical energy is extracted from the fluidic component(s) using an electrochemical system (referred to as "flow battery" in this document). In some scenarios, the advantages of such methods result in overall system efficiencies that can outperform those of conventional, gas-driven turbopump systems.

In certain disclosed implementations, a portion of a stage's battery mass is jettisoned during flight. The jettisoned mass is a discharged or partially discharged battery or battery component. As a result, the inert mass decreases as the stage increases its altitude. In some implementations, a stage's battery power comes from a plurality of battery packs, some of which are discharged and ejected from the stage before others. For example, a battery pack can be ejected after its energy is consumed, which may be well before the stage completes its flight. So, for example, if a stage uses two battery packs for each of the fuel and oxidant electric turbopumps, two of the battery packs can be ejected midway through the stage's flight path. This will reduce the mass of the stage in a certain implementation, for example, by about 30 kg. The total mass of a payload in these implementations measures roughly about 100 kg. Therefore, the battery packs' contributions to the inert mass of the stage is significant.

Depending on the type of battery, the jettisoning can be in either discrete units, periodically or continuously. Continuous jettisoning is accomplished with flow batteries that feature at least one fluidic component.

Both discrete and continuous battery jettisoning concepts are discussed in greater detail below.

One aspect of the disclosure pertains to rocket engine systems, in which a rocket engine system may be characterized by: (a) one or more rocket engines; (b) at least one electric turbopump, each turbopump including an impeller and an electric motor configured to rotate the impeller and configured to supply propellant to at least one of the rocket engines; (c) a plurality of battery cells (including battery units and/or battery packs); (d) one or more battery jettison mechanisms, each battery jettison mechanism configured to jettison a proper subset of the battery units from the rocket engine system; and (e) a controller, the controller communicatively connected with each of the one or more battery jettison mechanisms and configured to control the one or more battery jettison mechanisms to jettison at least one of the proper subsets of the battery units during flight of a rocket in which the rocket engine system is installed or within which the rocket engine system is to be installed. In certain embodiments, (i) each rocket engine includes a combustion chamber and a thrust nozzle, (ii) each proper subset of battery units has a top end and a bottom end with one or more of the battery jettison mechanisms, and (iii) the one or more battery jettison mechanisms for each proper subset are configured to jettison the corresponding proper subset of battery units such that the proper subset clears the thrust nozzle and/or other components in the aft of the rocket engine system. Further, the one or more battery jettison mechanisms for each proper subset may be configured to jettison the corresponding proper subset such that one of the top end and the bottom end of the proper subset experiences a higher velocity during and after the release as compared to the other end of the proper subset, such that the proper subset rotates after release.

In certain embodiments, the rocket engine systems include a framework that supports the proper subsets of battery units in an array centered on a first axis that, when the rocket engine system is installed on a launch vehicle, aligns with a center axis of the launch vehicle. The framework may support the proper subsets such that the proper subsets are within an envelope of the launch vehicle surrounding some or all of the one or more rocket engines.

In some implementations, the controller is also communicatively connected with the battery units and is further configured to: (i) monitor an amount of remaining battery capacity and/or battery health of each proper subset of the battery units, (ii) determine, at a first time, that the remaining battery capacity of a first proper subset of the one or more proper subsets of the battery units is no longer needed in order to provide sufficient electrical energy to power the at least one turbopump for the remaining duration of the rocket flight or that the battery health of the first proper subset is substantially degraded, and (iii) control the battery jettison mechanism associated with the first proper subset to jettison the first proper subset responsive, at least in part, to a determination that the remaining battery capacity of the first proper subset is no longer needed in order to provide sufficient electrical energy to power the at least one turbopump for the remaining duration of the rocket flight or to a determination that the battery health of the first proper subset is substantially degraded.

In certain embodiments, the battery units are configured to supply electrical power to the at least one electric turbopump in parallel and concurrently.

In certain embodiments, the rocket engine system includes a battery switching system configured to electrically connect at least some of the battery units to the at least one electric turbopump responsive to a signal received from the controller, where the controller is also communicatively connected with the battery units. The battery switching system may be configured to: (i) monitor an amount of remaining battery capacity and/or health of a first proper subset of the battery units, (ii) determine, at a first time, that the remaining battery capacity of the first proper subset is below a first threshold capacity, (iii) control, responsive to determining at the first time that the remaining battery capacity of the first proper subset is below the first threshold capacity, the battery switching system to electrically connect a second proper subset of the one or more proper subsets of the battery units to the at least one turbopump, and (iv) control, responsive to determining at the first time that the remaining battery capacity of the first proper subset is below the first threshold capacity, the battery jettison mechanism associated with the first proper subset to jettison the first proper subset. The controller may be additionally configured to control the battery jettison mechanism associated with the first proper subset to jettison the first proper subset after controlling the battery switching system to electrically connect the second proper subset to the at least one electric turbopump. In some implementations, the controller is further configured to determine the remaining battery capacity of the first proper subset based on the amount of time that the first proper subset has provided power to the at least one electric turbopump. In some implementations, the controller is additionally configured to determine the remaining battery capacity of the first proper subset based on a measurement of remaining battery capacity taken from the first proper subset.

In certain embodiments, the controller is additionally configured to: (i) monitor an amount of remaining battery capacity and/or battery health of the second proper subset, (ii) determine, at a second time, that the remaining battery capacity of the second proper subset is below a second threshold capacity, (iii) control, responsive to determining at the second time that the remaining battery capacity of the second proper subset is below the second threshold capacity, the battery switching system to electrically connect a third proper subset of the one or more proper subsets of the battery units to the at least one turbopump, and (iv) control, responsive to determining at the second time that the remaining battery capacity of the second proper subset is below the second threshold capacity, the battery jettison mechanism associated with the second proper subset to jettison the second proper subset.

Certain aspects of the disclosure pertain to launch vehicles, with an example launch vehicle being characterized by the following features: (a) a propellant vessel for storing a propellant; (b) a thrust chamber; (c) a turbopump configured to deliver the propellant to the thrust chamber; (d) an electric motor mechanically coupled to the turbopump; and (e) an electrochemical system with at least one fluidic component for providing electric power to drive the electric motor. The electrochemical system may be characterized by the following features: (i) a container for storing at least one fluidic component to be provided to the electrochemical system during operation and (ii) a reaction compartment including: at least one inlet for receiving the at least one fluidic component; terminals for connecting the electric motor to the electrochemical system; and at least one outlet for jettisoning the at least one the fluidic component from the launch vehicle after the fluidic component is fully or partially discharged or reacted in the reaction compartment. In certain embodiments, the launch vehicle is a stage of a rocket. In some implementations, the launch vehicle includes a jettisoning system, coupled to the at least one outlet, for delivering the fluidic component into one or more dump pipes, one or more nozzles, one or more propellant feed pipes upstream of the turbopump, a region downstream of the turbopump, and/or directly into the thrust chamber.

In certain embodiments, the at least one fluidic component includes a material employed by the electrochemical system to provide the electrical power. For example, the fluidic component may include an anode active material or a cathode active material. In some implementations, the launch vehicle additionally includes a second container for storing a second fluidic component to be provided to the electrochemical system during operation. In such cases, the reaction chamber may additionally include a second inlet for receiving the second fluidic component.

Certain aspects of the disclosure pertain to methods of operating a launch vehicle including (i) a propellant vessel for storing a propellant, (ii) a thrust chamber, (iii) a turbopump configured to deliver the propellant to the thrust chamber, and (iv) an electric motor mechanically coupled to the turbopump. One such method may be characterized by the following operations: (a) providing a fluidic component to a reaction compartment of an electrochemical cell; (b) fully or partially discharging the fluidic component in the electrochemical cell to produce electricity that powers the electric motor to deliver at least one propellant from the propellant vessel to the thrust chamber; and (c) expelling the fully or partially discharged fluidic component from the launch vehicle.

In certain embodiments, operations (a)-(c) are performed substantially continuously while the launch vehicle gains altitude. In certain embodiments, operations (a)-(c) are performed periodically while the launch vehicle gains altitude. In certain embodiments, the launch vehicle is a stage of a rocket. In some implementations, expelling the fully or partially discharged fluidic component involves delivering the fluidic component into the thrust chamber.

In some implementations, the fluidic component serves as at least a portion of the propellant. In some implementations, the fluidic component comprises anode active material in a liquid medium. In some implementations, the method additionally includes providing a second fluidic component to the reaction compartment, where the second fluidic component includes an anode active material in a liquid medium.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

DETAILED DESCRIPTION

As discussed above, this disclosure discloses various ejectable or jettisonable battery concepts for use with battery systems for launch vehicles. Both discrete battery ejection systems and flow battery ejection systems are discussed below.

Discrete Battery Ejection System

In some implementations, a launch vehicle or rocket system may be equipped with a plurality of discrete battery units; proper subsets of the plurality of battery units may then be jettisoned during flight in response to various conditions being met. The term "proper subset" refers to a subset of the battery unit population that does not include the entire battery unit population. In some implementations, each individual battery unit may form a proper subset, so the number of proper subsets may equal the number of battery units onboard the vehicle. In other implementations, multiple battery units may form a proper subset, in which case there will be fewer proper subsets than the overall number of battery units.

The battery units in a proper subset may be grouped together into a physically connected structure, referred to in this disclosure as a battery pack, and jettisoned as a single item, or the battery units in the proper subset may be logically grouped together and jettisoned as distinct, separate items. In some implementations, a proper subset may include multiple discrete clusters of battery units, e.g., three clusters of six battery units, where the battery units in each cluster are physically connected with one another by a framework and are treated as a single unit.

Figure 1:
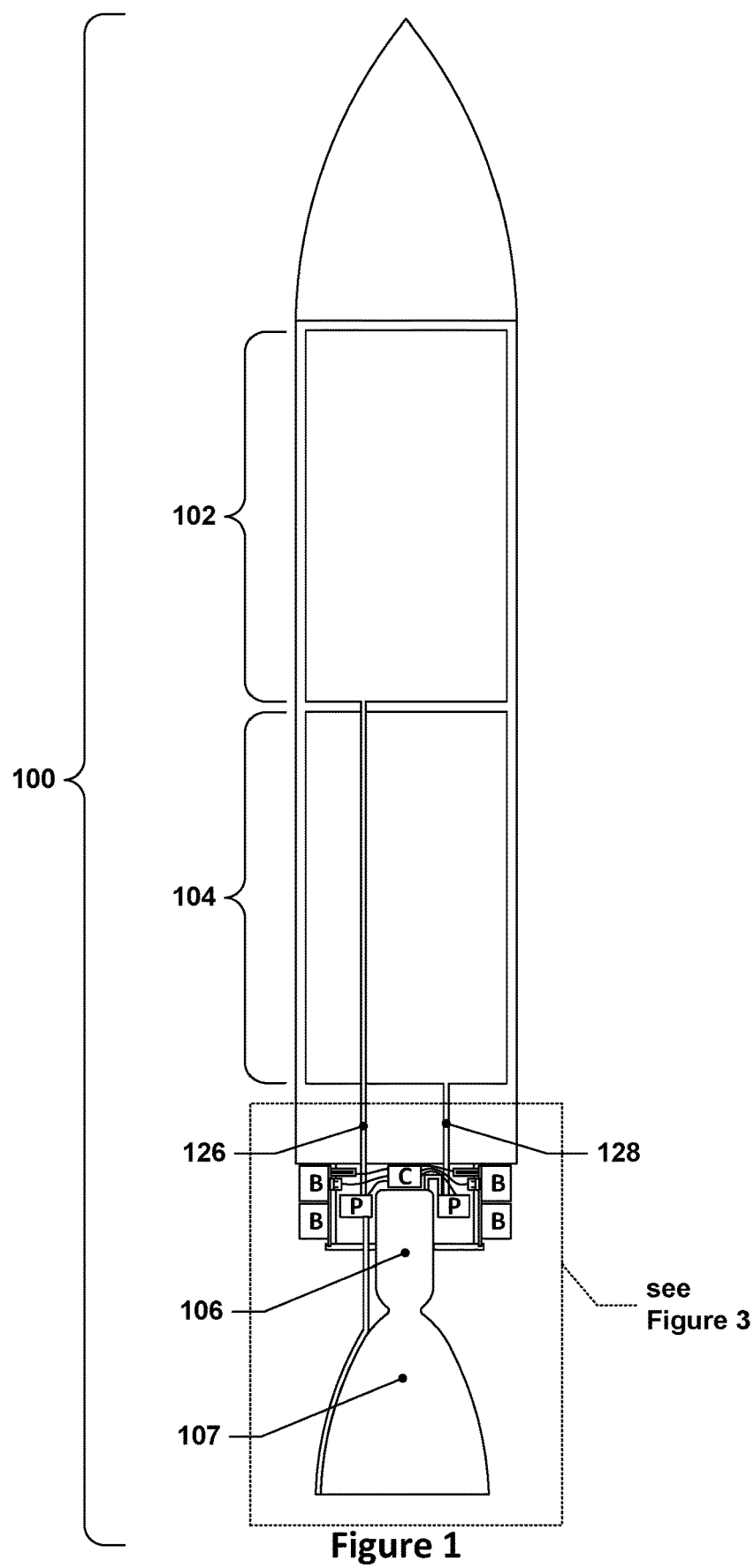
FIG. 1 depicts a schematic of a launch vehicle with an ejectable or jettisonable battery system.

FIG. 1 depicts a schematic of a launch vehicle 100 with an ejectable or jettisonable battery system. FIG. 3 depicts a detail view of the aft end of a typical launch vehicle 100 with a rocket engine. FIGS. 2, 4, 5 and 6 depict the same launch vehicle, but in different stages of the battery jettisoning process; the components called out in FIGS. 1 and 3 are not called out again in FIGS. 2, 4, 5 and 6 in the interest of avoiding clutter in the drawings. The reader is directed to the callouts for the equivalent components with respect to FIG. 1 for reference.

The launch vehicle 100 may include a main body that houses a first propellant tank 102 and a second propellant tank 104; the first propellant tank 102 may supply a first propellant, e.g., kerosene, to a first turbopump 110 via a first propellant line 126. The second propellant tank 104 may, similarly, supply a second propellant, e.g., an oxidizer, to a second turbopump 112 via a second propellant line 128 or it may be fed without using a turbopump, using instead a pressurized tank, the vehicle's acceleration or any other system that generate a pressure gradient between the tank and the injector/combustion chamber. The first turbopump 110 and the second turbopump 112 may be powered via power supplied from a controller 108, which is, in turn, provided with power from one or more battery units 114 that are each part of proper subsets 116. The first turbopump 110, the second turbopump 112, and the controller may be supported, for example, by a framework 120 that is attached to, or part of, the after end of the launch vehicle 100. The first turbopump 110 may provide the first propellant to a thrust chamber 106, e.g., such as through a regenerative cooling system 109 that has an inlet at the base of the thrust chamber and that flows the propellant through channels within the skin of the thrust chamber 106 and extending from the lower end of the thrust chamber 106 to the upper end of the thrust chamber 106, where the heated propellant may then be flowed into the combustion section of the thrust chamber 106. The propellant may also be delivered directly into the injector or thrust chamber without passing through a regeneratively cooled combustion chamber. The second turbopump 112 may provide the second propellant to the combustion section of the thrust chamber 106. The thrust chamber 106 includes a combustion chamber that is typically cylindrical in shape, but can have any other geometrical shape, and a converging-diverging thrust nozzle 107. The thrust nozzle 107 converts the energy released in the combustion chamber into thrust by accelerating the fluid to high velocities.

The framework also may support a plurality of battery units 114 that are arranged into proper subsets 116. In this implementation, each proper subset 116 may include at least one battery unit 114 that is/are mounted to a common structure or backing plate 115. While only two proper subsets 116 are shown in this case, additional proper subsets 116 may be placed at other locations on the vehicle. They may be arranged to form a radial or circular array about the center axis of the launch vehicle 100, or may be arranged in any other symmetric, asymmetric, or even random pattern. For the purposes of this disclosure, each proper subset 116 of battery units 114 may include a top end 132 and a bottom end 134, which are located at opposite ends of each proper subset 116. The top end 132 is forward of the bottom end 134 with respect to the direction of travel for the launch vehicle 100. Each proper subset 116 may be electrically connected with the controller 108 via a connector 118. Each proper subset 116 may also have an associated jettison mechanism 122 that is configured to jettison the proper subset 116 from the launch vehicle 100. The jettison mechanism may, for example, include pistons or plungers configured to push against the proper subset 116 when activated, as well as pyrotechnic actuators, frangible bolts or nuts, latches, or any other releasable fastening device(s) that serve to prevent the associated proper subset 116 from being released prematurely, and serve to jettison the proper subset when required. In many implementations, however, each jettison mechanism 122 may be configured to impart a force or impulse to the associated proper subset 116 at either a single or at multiple locations. There may be a single or multiple jettison mechanisms on each proper subset. The top end of the proper subset as well as the bottom end of the proper subset may feature a jettison mechanism. FIGS. 2, 4, 5 and 6 depict an implementation where the top end 132 exerts a force or impulse, whereas no secondary jettison mechanism exists on the bottom end of the battery pack. This linear force or impulse may be applied in a direction that is typically normal to the launch vehicle center axis, but can be directed into any direction that serves to separate a proper subset from the vehicle. The bottom end 134 may be supported in a manner that causes the proper subset 116 to begin rotating during and after the release, such that the top end 132 has a higher velocity relative to the launch vehicle 100 than the bottom end 134. Such a rotation of the ejected battery pack may be necessary in order to clear all downstream rocket engine components, in particular if the top end of a proper subset is constructed such that it reaches further into the vehicle than the bottom end does. In the depicted implementation, the bottom edge of the back plate for each proper subset 116 is captured in a groove provided in a ledge 124, which supports the associated proper subset 116 during thrust and also permits the proper subset 116 to rotate away from the center axis of the launch vehicle about the groove/ back plate interface. In other example implementations, the proper subsets 116 may be mounted to the framework 120 using one or more jettison mechanisms 122 with release devices that allow for a release even under shear loads in the jettison mechanism(s).

Figure 2:
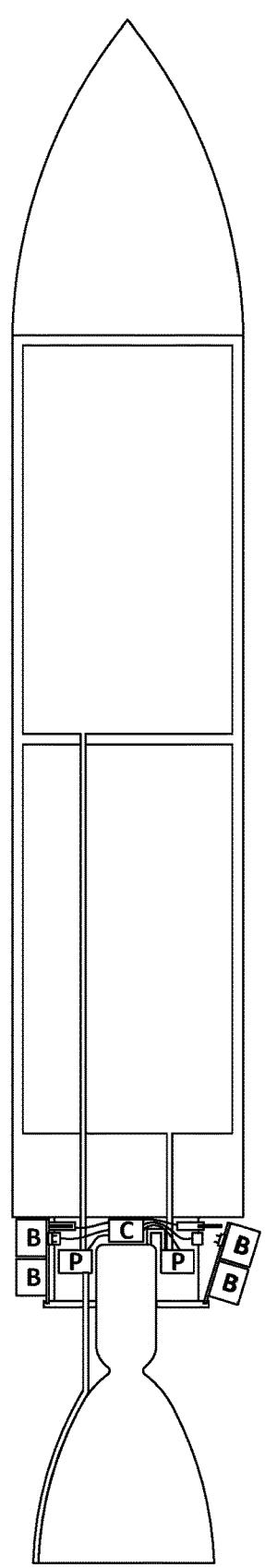
FIGS. 2 and 4 through 6 depict the same launch vehicle as in FIG. 1, but in different stages of the battery jettisoning process.
Figure 3:
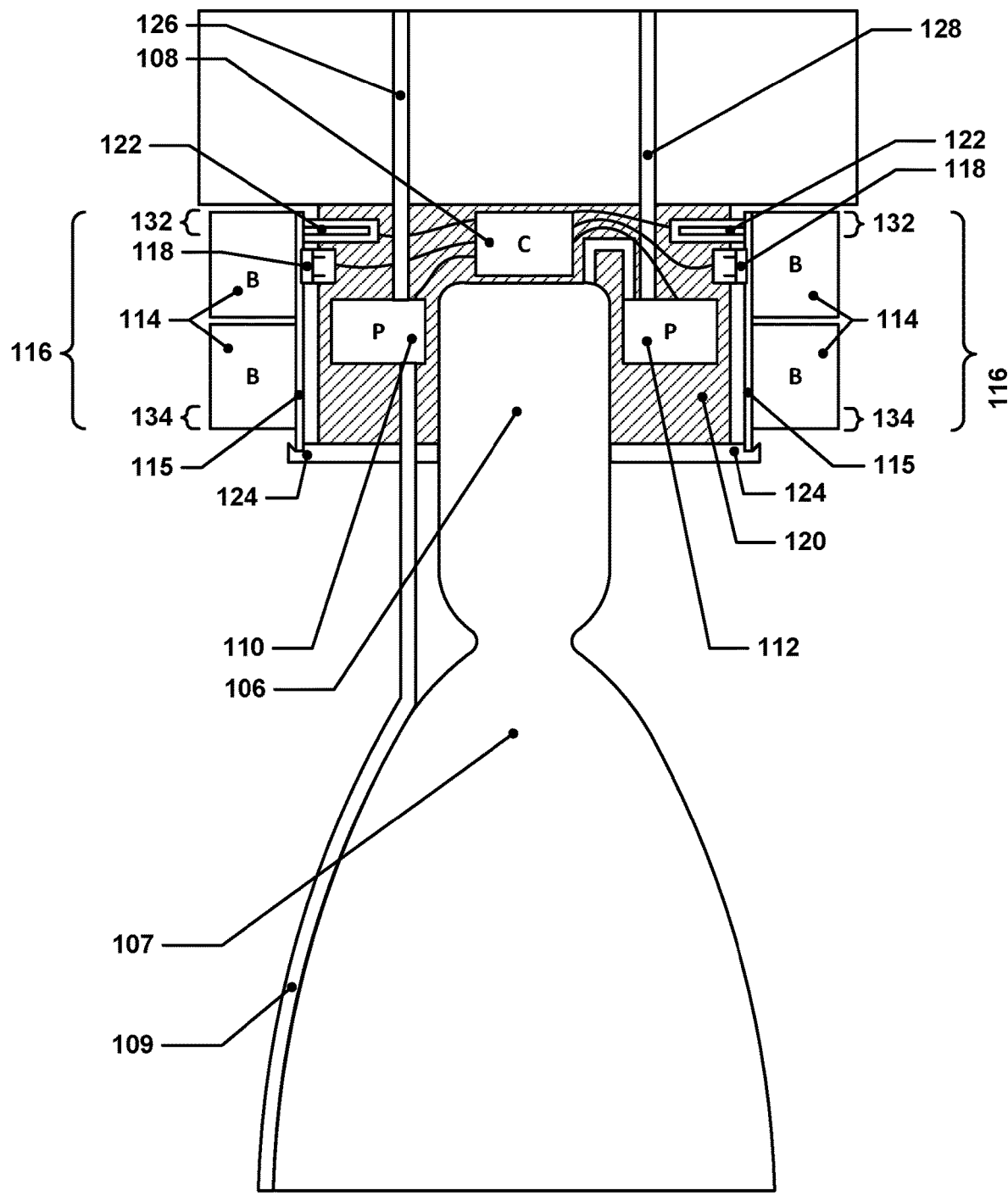
FIG. 3 depicts a detail view of the aft end of the launch vehicle.
Figure 4:
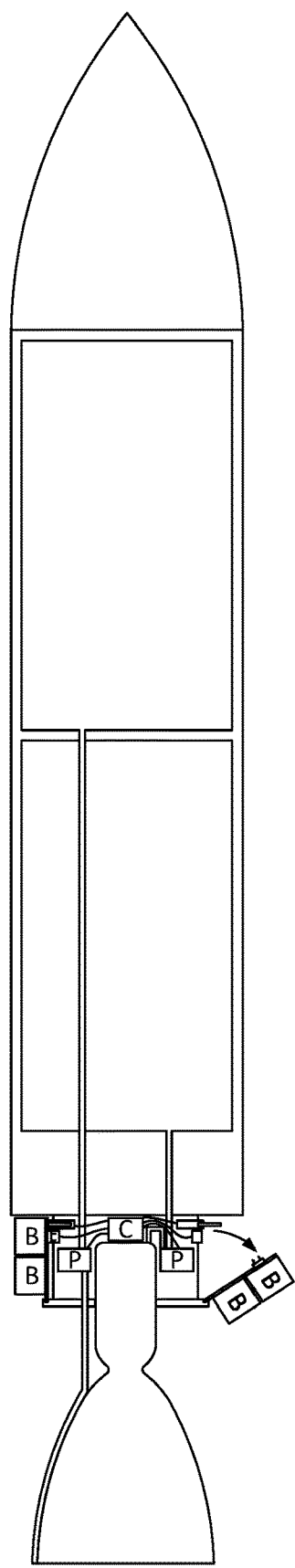
Figure 5:
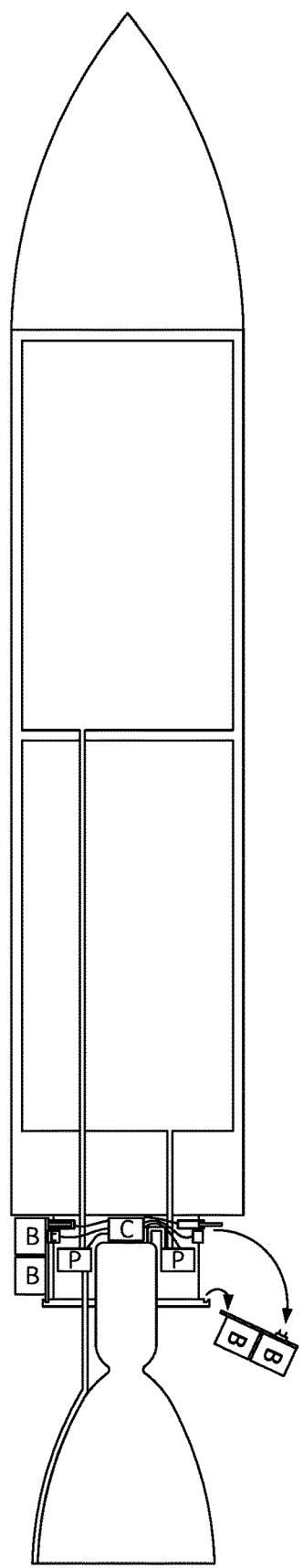
Figure 6:
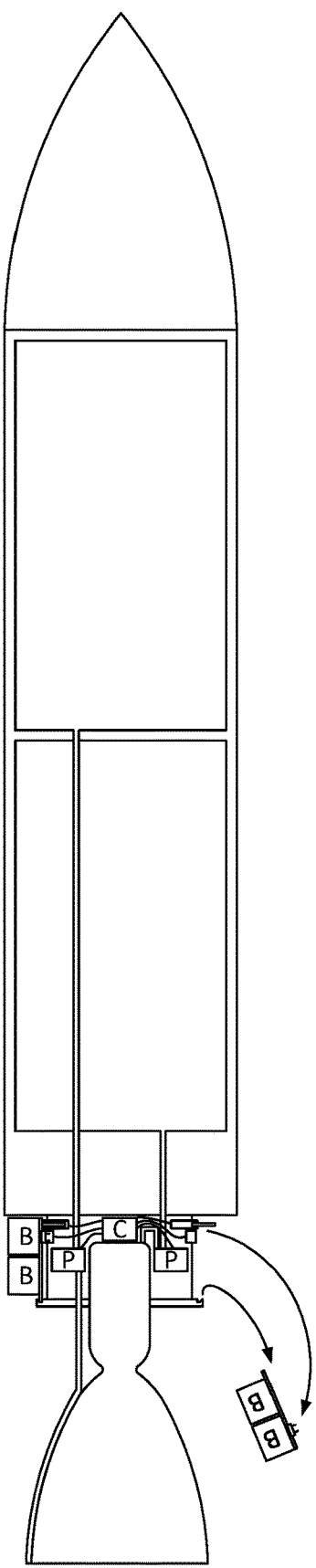

The behavior of the proper subset 116 during jettison is illustrated in FIGS. 2, 4, 5 and 6. As can be seen in FIG. 2, the proper subset 116 has been released and has started to rotate away from the center axis of the launch vehicle 100, propelled by the force or impulse imparted to it by the jettison mechanism 122. The force or impulse delivered by the jettison mechanism 122 has caused the connector 118 to pull out from its mating element that is fixed or floating with respect to the framework 120. In FIG. 4, the proper subset 116 has continued to rotate about the point where the back plate is resting on the ledge 124. In FIG. 5, the proper subset 116 has continued to rotate and the back plate has now disengaged from the ledge 124 and the entire proper subset 116 is now "below" the ledge 124. In FIG. 6, the proper subset 116 has continued to fall further aft of its initial position and is clear of the thrust chamber 106 and thrust nozzle 107 or any other component(s) downstream of the battery pack(s).

Figure 7:
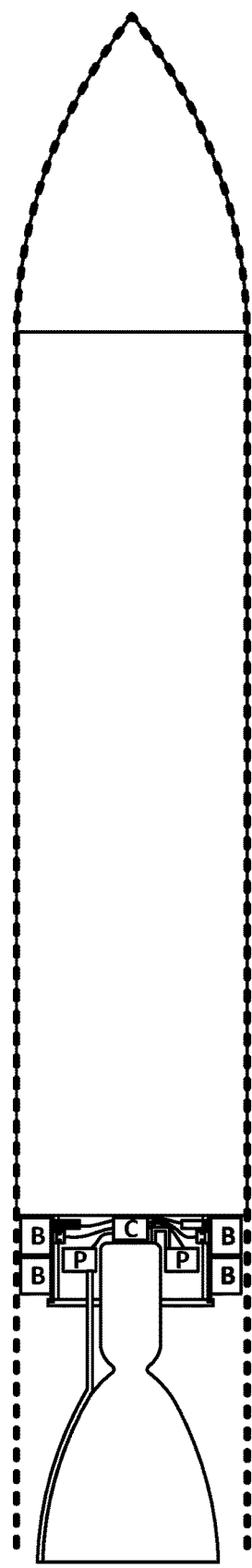
FIGS. 7 through 10 depict different examples of envelopes defined by the outer skin of various launch vehicle types.
Figure 8:
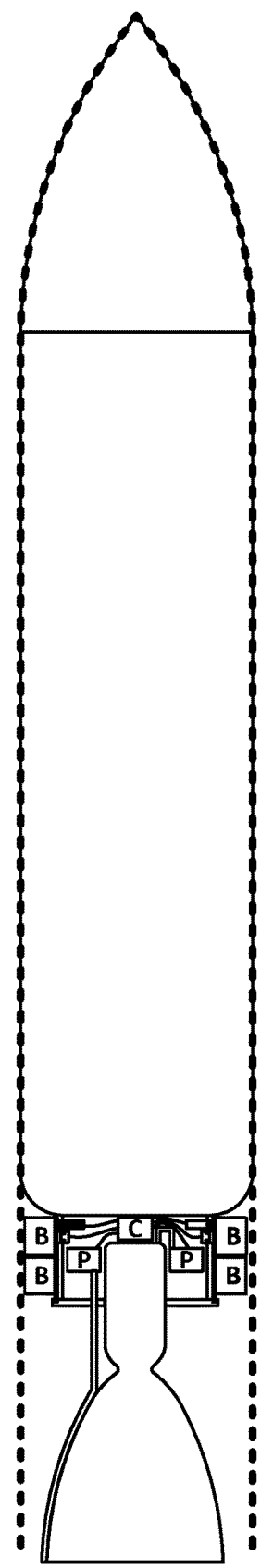
Figure 9:
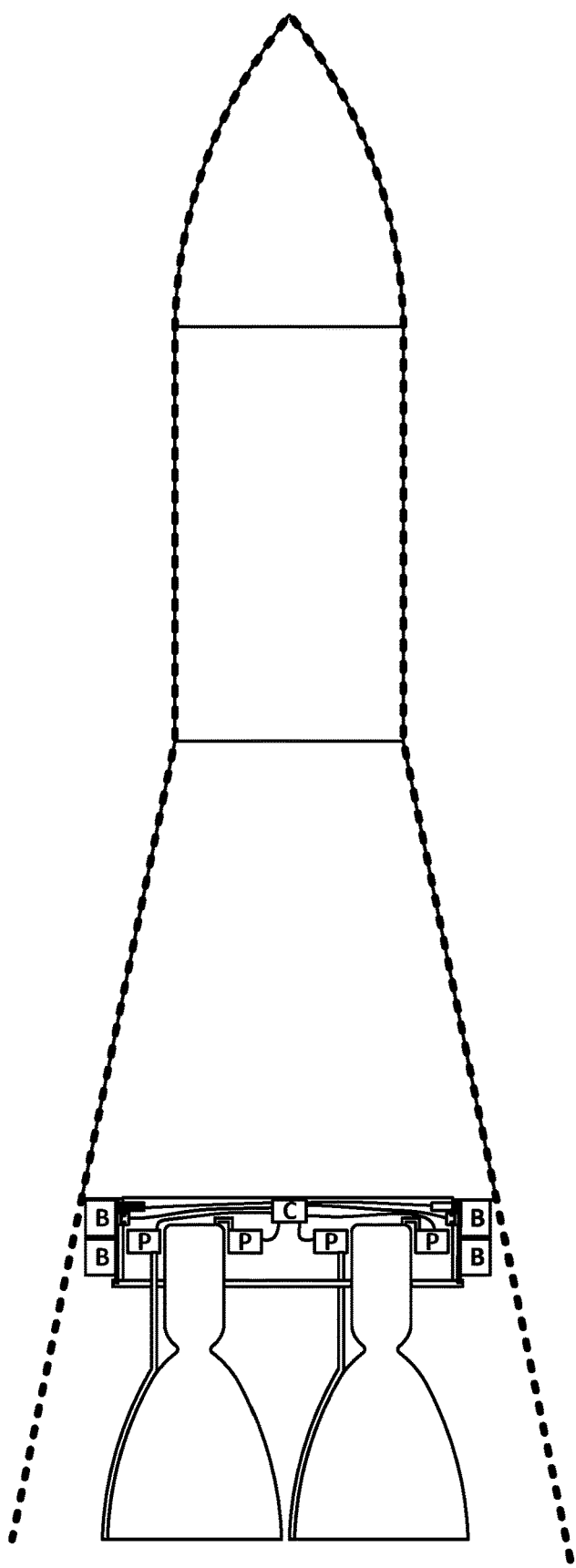
Figure 10:
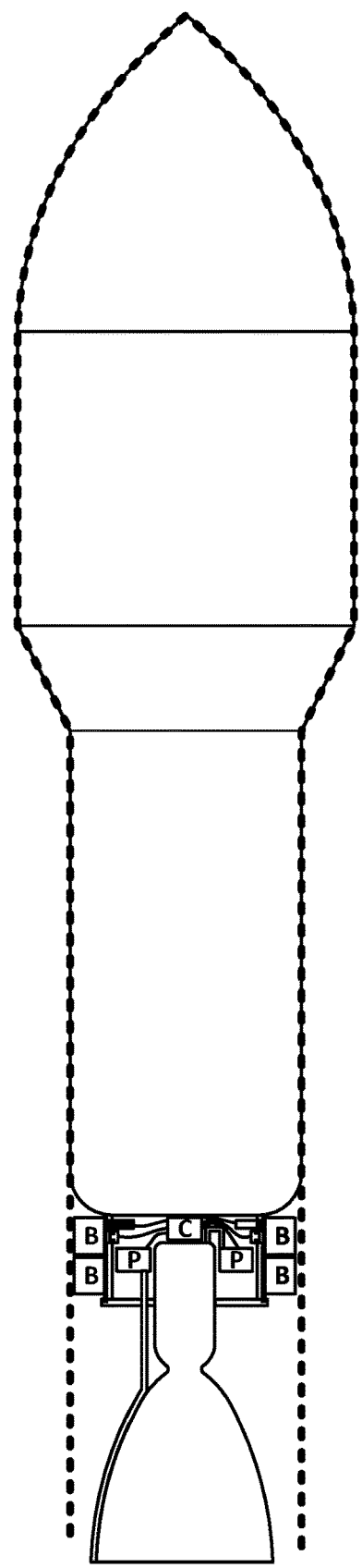

As discussed, the battery units and/or battery packs may be mounted to a framework located at the aft end of the rocket or launch vehicle; this framework may, for example, also support one or more rocket engines, turbopumps, and/or other components of the launch vehicle. The battery units/packs may also be located within an envelope that is nominally defined by the outer skin or fairing of the launch vehicle. The battery packs typically do not protrude from this vehicle envelope. This envelope, examples of which are provided for various launch vehicle types in FIGS. 7 through 10, may extend beyond the "trailing edge" of the fairing or skin in a direction parallel to the skin or fairing at the point where the trailing edge exists (the envelopes are shown in each Figure using heavy dotted lines). For example, in a launch vehicle with a cylindrical fairing or skin, such as in FIG. 7, the envelope may extend from the aft edge of the fairing such that the rocket engine and battery units depicted are within a cylindrical volume that has the same diameter as the fairing or skin at the trailing edge. In some implementations, the "trailing edge" of the envelope may be provided not by a discrete edge, but instead by a rounded corner, such as is shown in FIG. 8, in which the trailing edge of the fairing or skin is provided by the tangent edge formed by the intersection of the cylindrical fairing or skin and the "rounded" portion adjacent to the rocket engine components. In some implementations, the envelope may not have a constant diameter, as was the case in FIGS. 7 and 8. For example, in launch vehicles that are tapered along their long axis, such as the launch vehicle in FIG. 9, the envelope may extend from the trailing edge of the fairing or skin of the launch vehicle in a direction that is parallel to the skin or fairing in the immediate vicinity of the trailing edge. In FIG. 9, the envelope extends beyond the trailing edge of the launch vehicle fairing or skin and forms a frustoconical shape. Generally speaking, the trailing edge may occur at or near the portion of the fairing or skin that has the largest outer circumference. However, there are instances where this is not the case, such as in the implementation shown in FIG. 10, where a launch vehicle with an expanded-diameter payload section is shown. The envelope, in this case, does include the expanded-diameter payload section, but the trailing edge is not defined by the diameter of the payload section, which is the largest diameter of the launch vehicle. Instead, the envelope is defined by the largest diameter of the launch vehicle in close proximity to the aft end, which is smaller than the payload section diameter. Generally speaking the trailing edge will be located in the aftmost 25% of the launch vehicle. This disclosure also includes implementations where the battery packs are mounted not in the aft, but the forward sections of the vehicle. Also contemplated are all designs mounting the battery units/packs in a way where they slightly protrude the herein outlined vehicle envelopes.

By placing the battery units/packs within the envelope, they do not protrude from the envelope, which would cause aerodynamic drag negatively affecting the aerodynamic performance of the launch vehicle. For example, jettisoning a battery unit/pack, in addition to causing a change in the vehicle's mass properties due to the removal of battery mass, may also remove sources of drag in locations where the battery units/packs that were jettisoned were previously located. This resulting shift and additional moment in the aerodynamic drag force may then have to be accounted for by the guidance system, which may, in turn, require the use of additional energy to adjust the course of the rocket. In many implementations, the battery units/packs may be placed in a circular array or arrays about the centerline of the launch vehicle, between the throat of the thrust chamber of the rocket engine (the narrowest part of the thrust chamber) and the aftmost bulkhead or surface of the launch vehicle fairing, aftmost propellant tank, or other major surface of the launch vehicle. Such placement, however, may introduce some complications, as the battery units/packs may be close enough to the centerline of the launch vehicle that they might strike the thrust chamber or thrust nozzle were they simply jettisoned so as to fall in a direction parallel to the center axis of the launch vehicle, as may be safely done if the battery units/packs were instead mounted to the skin or fairing of the launch vehicle and positioned outside of the envelope.

There are at least two different battery jettison techniques that may be practiced in a launch vehicle with a jettisonable battery system. In the first, which is referred to herein as a "warm swap," all of the proper subsets may be connected in parallel and used to concurrently power the turbopump(s); at various points during the flight of the launch vehicle, proper subsets that are no longer needed to complete the rocket engine burn may be jettisoned to lighten the launch vehicle. In the second, which is referred to herein as a "hot swap," the proper subsets are not used to concurrently power the turbopumps, but are instead used to power the turbopump sequentially. After the battery charge in the proper subset currently being used is sufficiently depleted, one of the remaining, unused proper subsets may be brought online to power the turbopumps, and the depleted proper subset may be jettisoned to lighten the launch vehicle. It is to be understood that in many implementations there will typically be a relatively short time interval, e.g., on the order of a few seconds or less, during which the proper subset that is to be jettisoned and the proper subset that is to be used next in order to power the turbopumps are both connected so as to supply power to the turbopumps simultaneously. This may prevent a loss of power to the turbopumps when the depleted proper subset is jettisoned. In some implementations, however, the subsequent proper subset may be brought online immediately after the depleted proper subset is jettisoned; the power interruption that may occur may be so short that the turbopump performance is not interrupted in a significant manner. Both techniques are discussed in more detail below.

In the warm swap technique, as discussed, all of the proper subsets of battery units may be used to power the turbopumps concurrently, and at various intervals during the rocket engine burn, one or more of the proper subsets that is no longer needed during the flight may be jettisoned to reduce weight. While the battery units in each proper subset may generally all deplete at the same rate during the burn, due to manufacturing variances in the battery units, there may be some proper subsets that deplete at an accelerated rate as compared with the remaining proper subsets. In some cases, one or more battery units may experience a technical failure, e.g., a short circuit, that may compromise the battery unit performance or, in a worst case scenario, jeopardize the entire launch vehicle, such as may occur if a battery unit catches fire. The controller may be configured to monitor the amount of remaining battery capacity or that remains in each battery unit or in each proper subset of battery units or their health and periodically evaluate these battery capacities to determine if any of the proper subsets is no longer needed/wanted to power the turbopumps for the remainder of the rocket engine burn. The controller may measure the remaining capacity in the battery units by, for example, measuring the voltage supplied by each battery and then converting it to a battery unit capacity. The controller may monitor the battery units' health by for a short other condition detrimental to performance. For example, a battery may short internally at very high discharge rates, in which case it may overheat and potentially cause issues. In this example, the health of the battery can be monitored by temperature—if the temperature exceeds a certain value, the battery can be ejected early. If a proper subset is deemed to no longer be necessary to complete the burn, then the controller may control the jettison mechanism for that proper subset to jettison the proper subset. The controller may make such a determination in a variety of ways. In other implementations, the controller may be configured with a pre-defined proper subset jettison sequence that may be defined based on the estimated capacities of the battery units in each proper subset. For example, a proper subset with an initial capacity that is lower than the initial capacity of other proper subsets may be scheduled for jettisoning before those other proper sub sets.

In some implementations, the controller may be configured to consult a predicted power budget that tracks anticipated electrical power needed to complete the burn as a function of elapsed time from burn initiation. The controller may reference a timer that indicates the amount of time elapsed from the start of burn initiation, determine the remaining power budget that is needed, and then evaluate the remaining capacity in the proper subsets to determine if the proper subsets that would remain if the lowest-capacity proper subset were to be jettisoned are sufficient to provide the anticipated power budget. If so, then the lowest-capacity proper subset may be jettisoned.

In other implementations, the controller may be configured to calculate a predicted power budget in real-time based on feedback from various sensor systems on the launch vehicle. For example, if the launch vehicle includes sensors to determine how much propellant is remaining in the propellant tanks, then such information may be used by the controller, in combination with a predicted (or measured) nominal flow rate of propellant to the rocket engine(s), to determine the total maximum burn time remaining. The controller may then calculate the power budget needed based on the remaining burn time and nominal flow rate.

In yet other implementations, the controller may estimate the maximum burn time that remains, and thus the anticipated power budget, by referencing data from a navigation system carried by the launch vehicle. More specifically, the controller may estimate the maximum burn time by referencing the current state vector and the target state vector in the guidance algorithm.

As is evident, there are several criteria that may be used to determine when a proper subset of battery units is to be jettisoned. It is to be understood that, in some implementations, two or more such criteria may be used in combination in order to determine if the lowest-capacity proper subset of battery units is to be jettisoned. In some implementations, the decision by the controller to jettison a proper subset of battery units, and the decision as to which proper subset to jettison, may be based on factors other than battery capacity and remaining burn duration alone. For example, if the battery units are equipped with temperature sensors and one of the temperature sensors indicates that a particular battery unit is experiencing abnormal temperature fluctuations that may be indicative of premature failure, the controller may select the proper subset that includes that particular battery unit as the next proper subset to be jettisoned, even if there are other proper subsets with lower battery capacity available.

Figure 11:
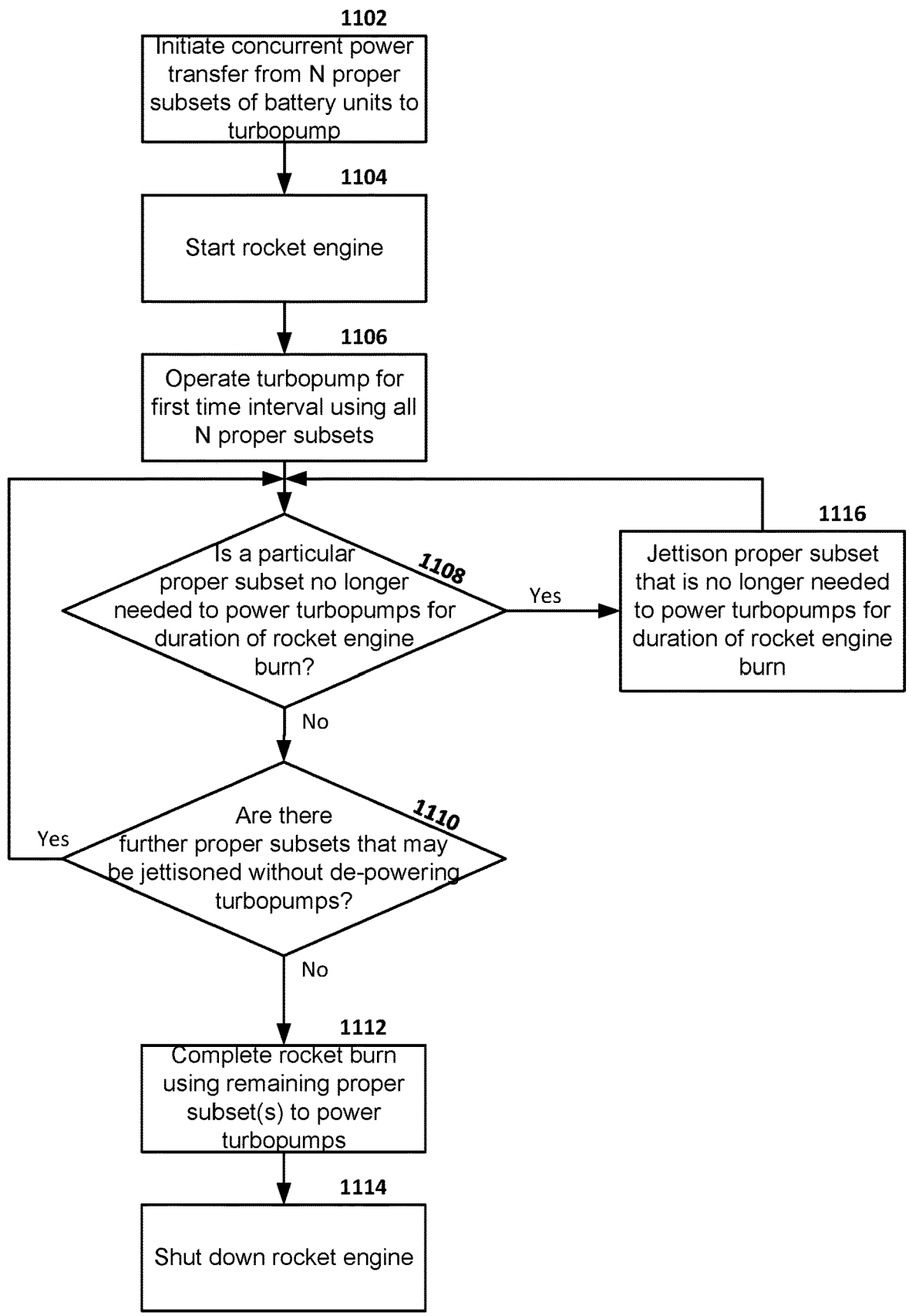
FIG. 11 depicts a flow chart of the warm-swap technique.

FIG. 11 depicts a flow chart of the warm-swap technique. In block 1102, concurrent power transfer from a plurality of N battery units to the turbopump(s) is initiated; in block 1104, the rocket engine is started with fuel provided by the turbopumps. In some instances, the turbopumps and rocket engine may be started prior to initiating power transfer from the N battery units, e.g., the rocket engine and turbopump start may be initiated using an external power supply, and the battery units may be brought on-line after the rocket engine has been started.

In block 1106, the turbopump may be operated for a first time interval using all of the N battery units. In block 1108, a determination may be made as to whether a proper subset of the N battery units is no longer needed to power the turbopumps for the remaining duration of the rocket engine burn. If the proper subset is no longer needed, then the technique may proceed to block 1116, where the proper subset may be jettisoned. The technique may then return to block 1108 to see if further proper subsets may be jettisoned.

If it is determined in block 1108 that the proper subset of batteries is still needed, then the technique may proceed to block 1110, in which it may be determined if there are further proper subsets that may still be jettisoned without de-powering the turbopumps. If there are, the technique may return to block 1108. If there are not, then the technique may proceed to block 1112, in which the turbopumps are powered for the remaining duration of the rocket engine burn by the remaining proper subset(s). In block 1114, the rocket engine may be shut down. Block 1108 may be performed continuously, e.g. as quickly as the controller can perform such determinations, or may be performed at regular intervals, e.g., once a minute or every couple of seconds. Whether or not a particular proper subset is no longer needed to complete the burn may depend on the amount of time remaining in the burn, the rate at which each proper subset is depleted, and other factors—this determination is thus a predictive determination, and may, as more data becomes available, change. Thus, as the burn progresses, a proper subset's eligibility for jettisoning may change from "not jettisonable" to "jettisonable." For example, while block 1108 may result in a determination at a point early in a rocket burn that a particular proper subset is still needed to power the turbopumps for the duration of the rocket engine burn, block 1108 may result in a different determination at a later point during the rocket engine burn. Block 1110 thus serves to cause the evaluation in block 1108 to be repeated until there are no proper subsets remaining that could still be jettisoned while still safely completing the burn, e.g., if there is only one proper subset remaining, then jettisoning it would cause the turbopumps to lose power, which should be avoided if the turbopumps are still needed to supply propellant to the rocket engine.

In the hot-swap technique, as discussed above, the proper subsets are used to power the turbopumps in a sequential manner rather than concurrently. FIGS. 12 through 16 depict a schematic for an example hot-swap jettisonable battery unit system for a launch vehicle during various stages of the launch vehicle's flight. In this example, there are three proper subsets 316 of three battery units 314 each. Each set of battery units 314 may be connected in parallel or in series within the proper subsets 316. Each proper subset 316 may be connected to a controller 308 by way of a connector 318. The connector 318 may pull out of a corresponding mating connector when the corresponding proper subset 316 is jettisoned from the vehicle. The controller 308 may also be communicatively connected with jettison mechanisms (not shown), and each jettison mechanism may be configured to jettison a corresponding proper subset 316. The controller may, at a desired time, send a signal to the jettison mechanism for a corresponding proper subset 316 to cause that jettison mechanism to jettison the corresponding proper subset 316.

While the controller 308 in this case is shown as a single block, the controller 308 may, in actual practice, be composed of a number of modules that are in communicative contact with one another, as well as other modules that may be effectively isolated from those modules. For example, the current draw and voltage supplied from the battery units 314 may be quite high and may be incompatible with the lower voltage and current requirements of various processors and other sensitive electrical components within the controller 308. As such, the controller may be arranged to electrically isolate the high-current, high-voltage electrical components from the lower-voltage electrical components. It is to be understood that the term "controller" is used herein to refer, in general, to electrical components that are operable to control various components in the launch vehicle, such as turbopumps for supplying propellants to the thrust chamber, the battery units, including, in some implementations, controlling when the battery units 314 in the proper subsets 316 are electrically connected to the turbopumps or the power supply system of the launch vehicle in general, and the jettison mechanisms. The control system may include one or more processors and/or application-specific circuits that are configured to provide such control. This description applies to the controller for the warm-swap technique as well.

Figure 12:
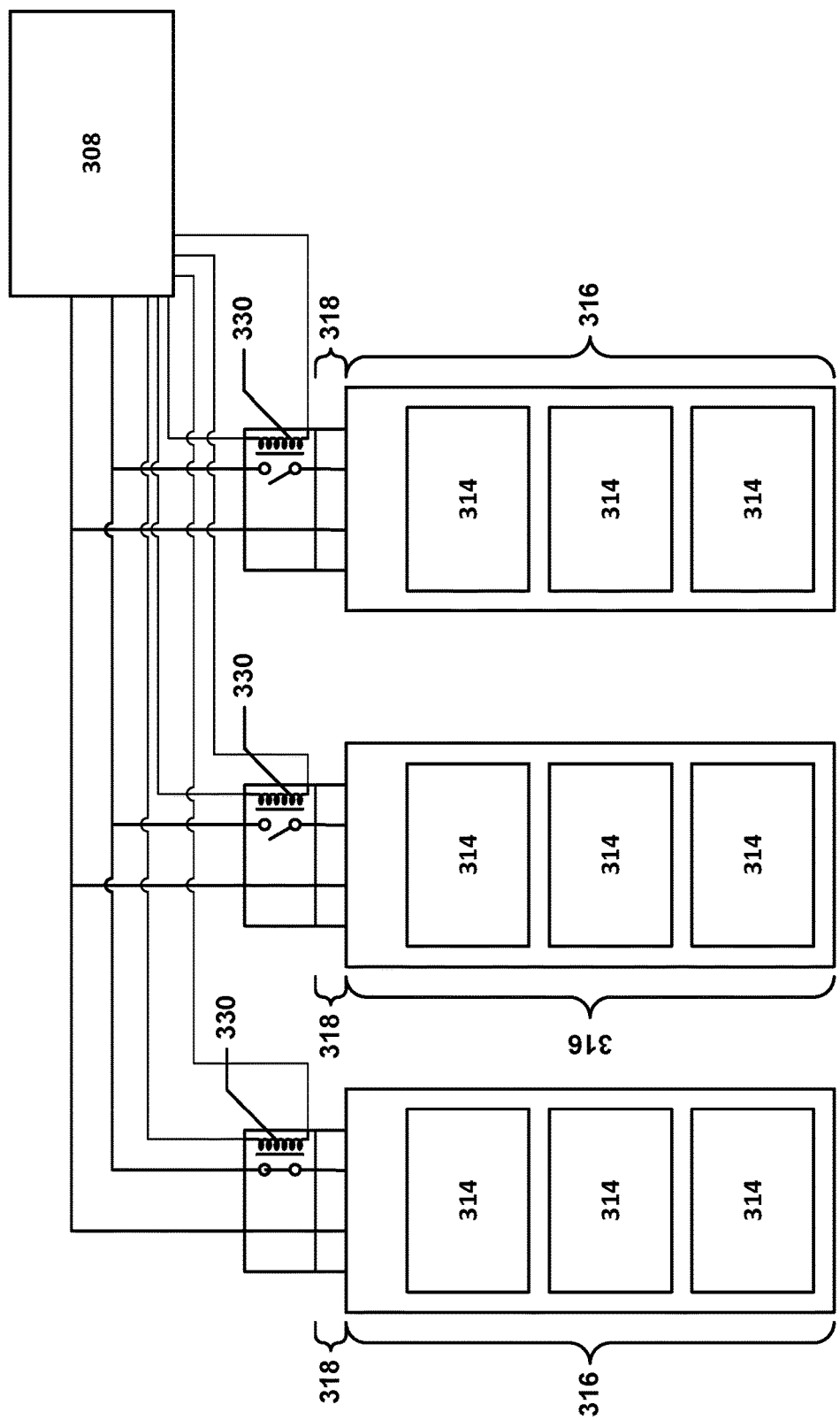
FIGS. 12 through 16 depict a schematic for an example hot-swap jettisonable battery unit system for a launch vehicle during various stages of the launch vehicle's flight.

In the hot-swap technique, the controller 308 may be configured to cause each proper subset 316 to supply power to the turbopumps at a different point during a rocket engine burn, e.g., sequentially. In order to provide control over when each proper subset 316 supplies power to the turbopumps, the system may include some form of controllable switching system that may be used to bring a particular proper subset "on-line," e.g., into a state in which the proper subset supplies power to the turbopumps. In the depicted system, such functionality is provided by relays or any other sort of electric switch 330 that are controlled by the controller 308 and that, when actuated, close a circuit that electrically connects the proper subset 316 to the turbopumps (or to the turbopumps via the controller). In FIG. 12, the relay for the left-most relay 330 is engaged, allowing the left-most proper subset 316 to supply power to the controller 308 (and thus to the turbopumps). The middle and right-most relays 330, however, are in an open-circuit state, preventing the middle and right-most proper subsets 316 from providing power to the controller 308.

Figure 13:
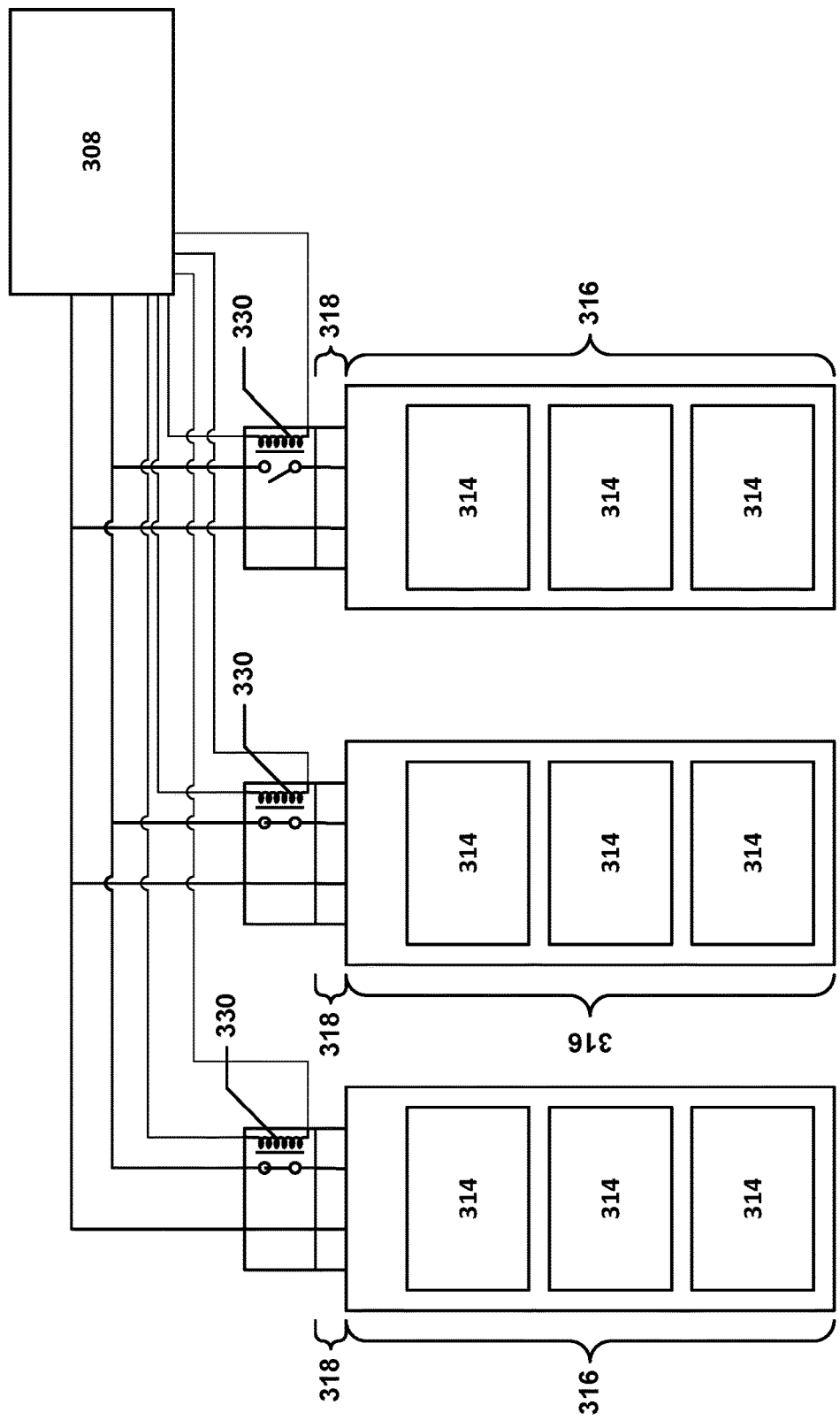
Figure 14:
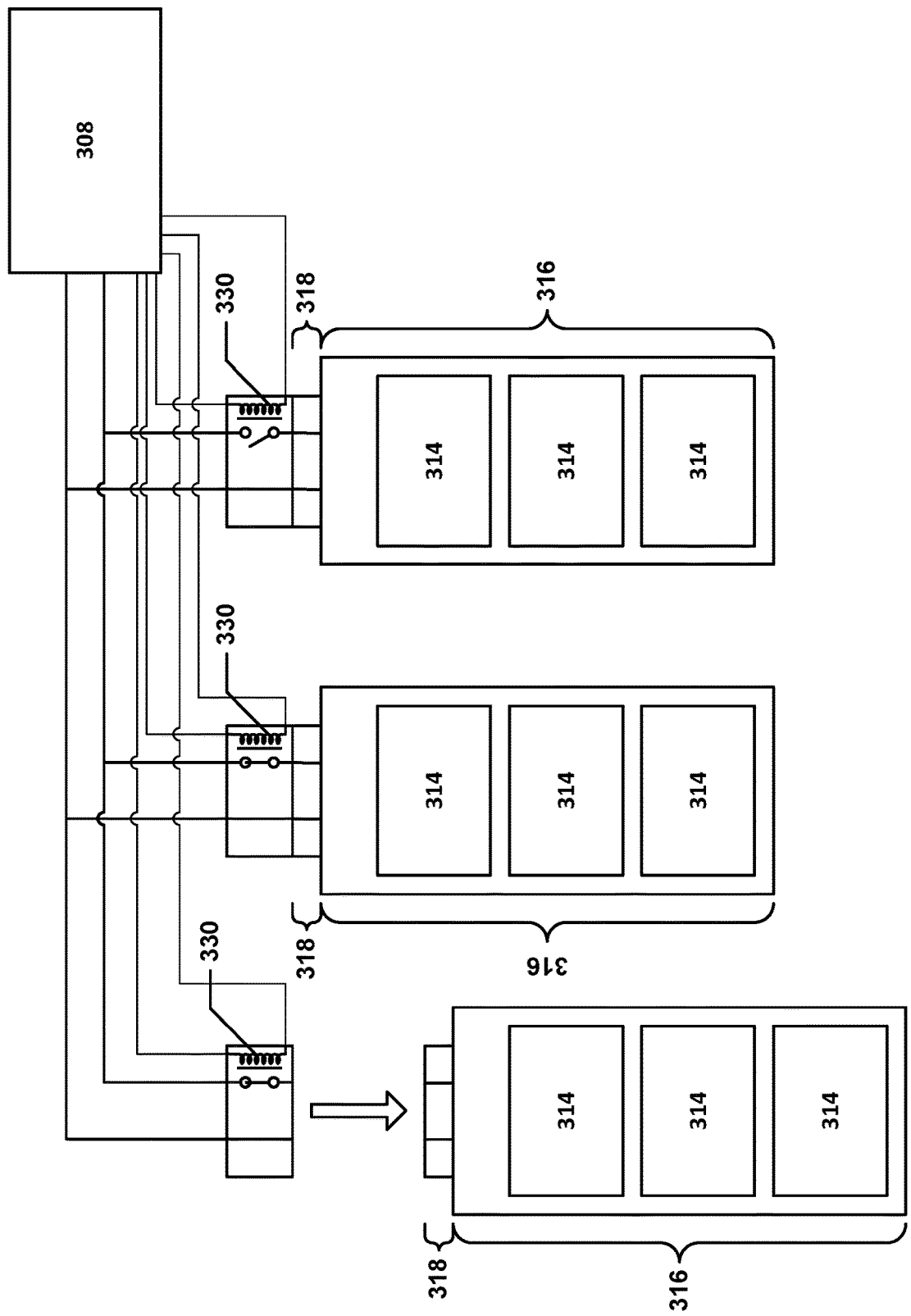

In FIG. 13, the left-most proper subset 316 has been depleted to the point where the controller 308 has determined that it should be jettisoned. Prior to jettisoning the left-most proper subset 316, the controller may actuate the middle relay 330, which causes the middle proper subset 316 to be brought on-line to provide power to the turbopump(s) via the controller 308. At this point in time, both the nearly-depleted left-most proper subset 316 and the at-capacity middle proper subset 316 are connected in parallel with the controller and/or turbopumps, which prevents a power interruption to the turbopumps. This arrangement, however, may also cause the at-capacity proper subset 316 to start directing power to the nearly-depleted, left-most proper subset 316. As this is a waste of power, the controller may be configured to minimize or otherwise reduce the period of concurrent operation of the two proper subsets. For example, within a few milliseconds or seconds after the middle proper subset 316 is brought on-line, the left-most proper subset 316 may be jettisoned, as indicated in FIG. 14. The left-most relay 330 may be left open, as shown, or may be closed by the controller 308 prior to jettisoning as a precautionary measure. This may reduce the possibility of arcing or other potentially undesirable behavior when the connector 318 is pulled free of its mating interface as a result of the jettison event.

Figure 15:
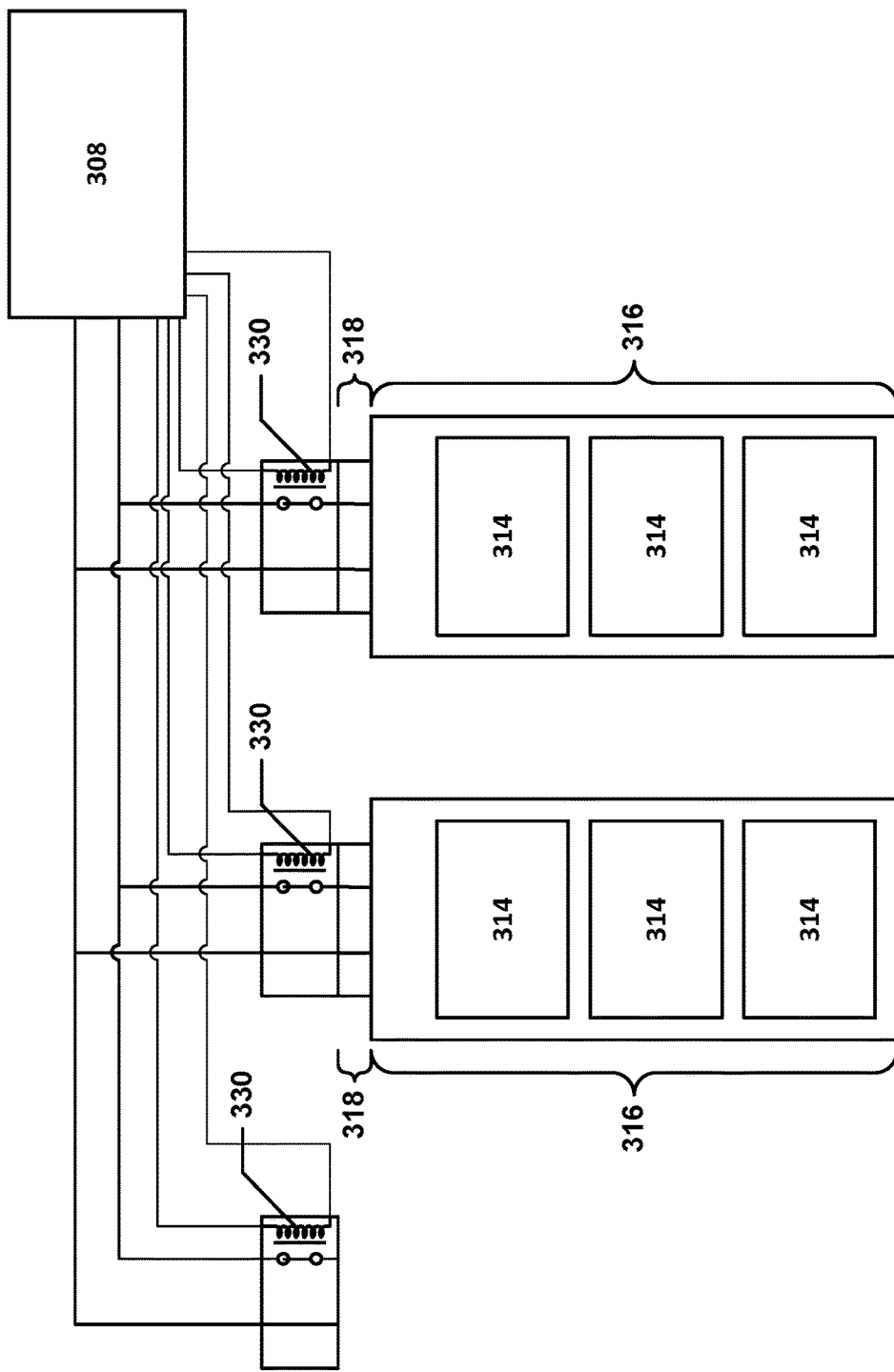
Figure 16:
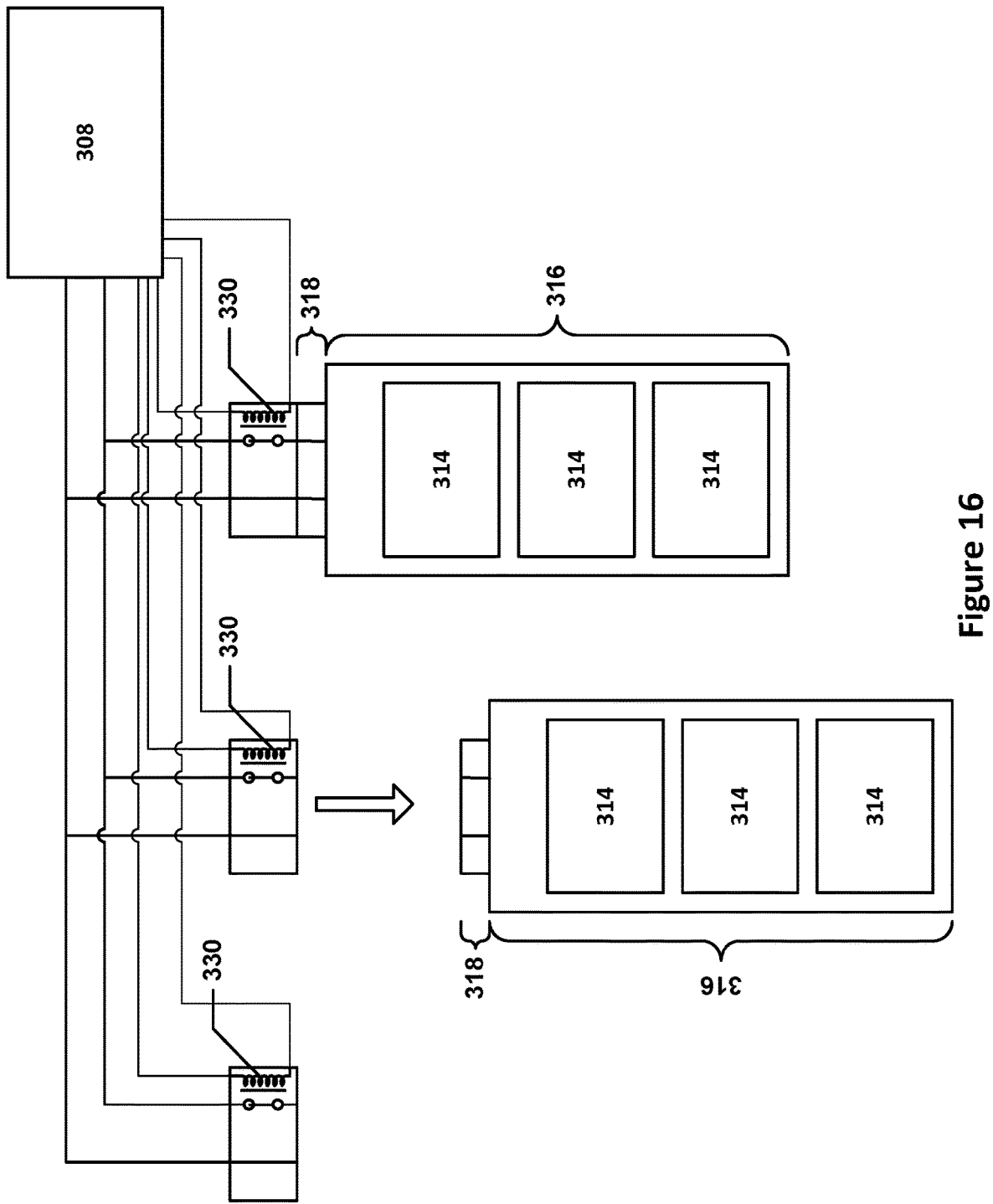

After jettisoning the left-most proper subset 316, the middle proper subset 316 may be used to power the turbopumps until the controller 308 determines that the middle proper subset 316 has been depleted to a sufficient level that jettisoning the middle proper subset 316 is warranted. In FIG. 15, the controller 308 has caused the relay 330 for the right-most proper subset 316 to engage so as to allow the right-most proper subset 316 to supply power to the turbopumps. As with the earlier proper-subset-switchover operation, the nearly-depleted middle proper subset 316 and the at-capacity right-most proper subset 316 may be operated concurrently for a short period of time during the transition process. In FIG. 16, the controller 308 has caused the middle proper subset 316 to be jettisoned, leaving the right-most proper subset 316 to power the turbopumps for the remainder of the burn. In some implementations, there may be one or more proper subsets 316 that are not normally used during the burn; these may be engaged by the controller if there is a failure in a jettisonable proper subset, e.g., a battery unit failure. These reserve proper subsets may be jettisonable, but may also be non-jettisonable since they may need to be available at any time during the rocket engine burn.

Figure 17:
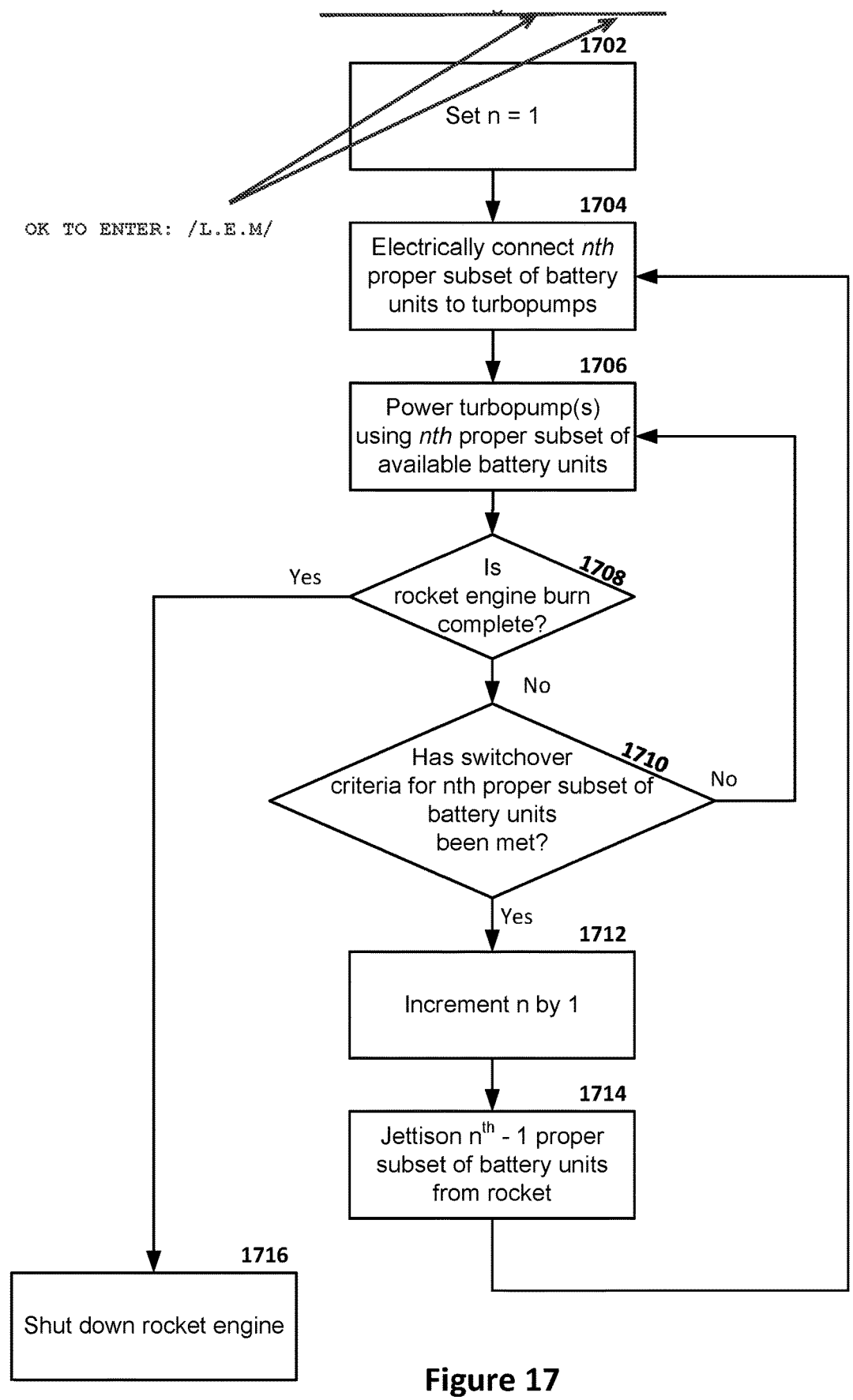
FIG. 17 depicts a flow diagram of a hot-swap technique.

FIG. 17 depicts a flow diagram of a hot-swap technique. In block 1702, a counter n may be set to 1, for example. In block 1704, an nth proper subset of battery units may be connected to the turbopumps for a launch vehicle rocket engine so as to supply power to the turbopumps in block 1706 and initiate propellant supply to the rocket engine. The rocket engine burn may be started after the propellant has started being supplied to the rocket engine. In block 1708, a determination may be made as to whether the rocket engine burn is complete; if so, then the rocket engine may be shut down in block 1716. If not, then a determination may be made as to whether switchover criteria 1710 for the nth proper subset have been met. Such criteria may, for example, be time based, e.g., has the nth proper subset been used for a pre-set period of time, or based on collected data, e.g., has the nth proper subset measured battery capacity fallen below a minimum threshold capacity indicating that the proper subset has been depleted? If the criteria (or criterion) has/have not been met, then the technique may return to block 1706. If the criteria (or criterion) has been met, then the technique may proceed to block 1712, in which n may be incremented by 1, and block 1714, in which the depleted proper subset may be jettisoned. It is to be understood that reference to the counter "n" is arbitrary and is merely used to explanatory purposes herein to illustrate the sequential nature of the hot-swap proper subset usage. It is to be further understood that other implementations may utilize a different mechanism for keeping track of proper subsets for hot-swap purposes.

In some implementations, the warm-swap and hot-swap techniques may be combined. For example, in some implementations, the a hot-swap technique may be employed where each proper subset of battery units is composed of multiple additional proper subsets of battery units that are used to concurrently power the turbopumps; the multiple additional proper subsets of battery units may be jettisoned individually at different times using a warm-swap technique, and then, when the proper subset is sufficiently depleted, all of the battery units remaining in the proper subset may be jettisoned and a new proper subset of battery units may be used to power the turbopumps.

Flow Battery Ejection System

The launch vehicle provides its electric turbopumps with electric power harnessed from an electrochemical system requiring periodic or continuous supply of a fluidic component. As the flow battery units are discharged, some or all of their mass may be ejected in either discrete jettison events or in a continuous manner. The fluidic component is delivered to a jettisoning system that may deliver the fluidic component to the thrust chamber or a dump pipe, while non-fluidic parts of the battery matter may stay onboard the vehicle or is also ejected. The additional mass flow into the combustion chamber may, but does not have to, provide additional thrust. The fluidic component of the electrochemical system may be a single-phase liquid, gas or a multi-phase combination of solids, liquids and/or gases. The fluidic component may be supplied to the combustion chamber periodically or in a continuous manner. The jettison events and/or the flow of battery matter into the jettisoning system can happen continuously or at discrete points along the trajectory that are either pre-determined or as deemed necessary during flight.

The flow battery system for powering the electric turbopumps may be any type or classification of an electrochemical system that periodically or continuously flows at least one fluidic component, it can be a flow battery in the traditional sense or a fuel cell. The flow battery can be a redox type flow battery using multiple electrochemically active electrolytes, a hybrid type flow battery using a combination of an electrochemically active electrolyte and solid electrodes, a semi-solid flow type battery where the charged solid particles are suspended in carrier liquids, or any other type of flow battery. The electrolyte may be in liquid or gaseous form. The flow battery may use a membrane to separate electrochemically active electrolytes or use a membraneless design where the electrochemically active electrolytes are in direct contact. The flow battery chemistry may be based on aqueous, non-aqueous, organic or inorganic substances. The flow battery design may be based on conventional designs, metal hydride designs, proton flow battery designs or any other design. In all cases, at least one of the electrochemically active substances or carrier substances is fluidic (e.g., liquid including slurries or gaseous) at some stage of the discharge process. The liquid or gas may or may not contain solid particles. After being at least partially discharged, the fluidic battery substance flows out of the battery system. The electrically discharged substance is then expelled from the vehicle either directly or indirectly by being admitted to the combustion chamber of the rocket engine. In either case, the ejected mass reduces the overall mass of the vehicle.

The fluidic components of the flow battery are either single-phase solid, liquid or gaseous substances or multi-phase substances compromised, for instance, of solid metals, metal hydrides, or metal salts immersed or suspended in liquid carrier substances. At least one fluidic component is required for a battery to class as a flow battery in the context of this disclosure. The fluidic components are sometimes referred to as "electrolytes" in this disclosure. An electrolyte accepting electrons from an electrode is referred to as a "catholyte" whereas the electrolyte supplying electrons to an electrode is referred to as an "anolyte".

Figure 18:
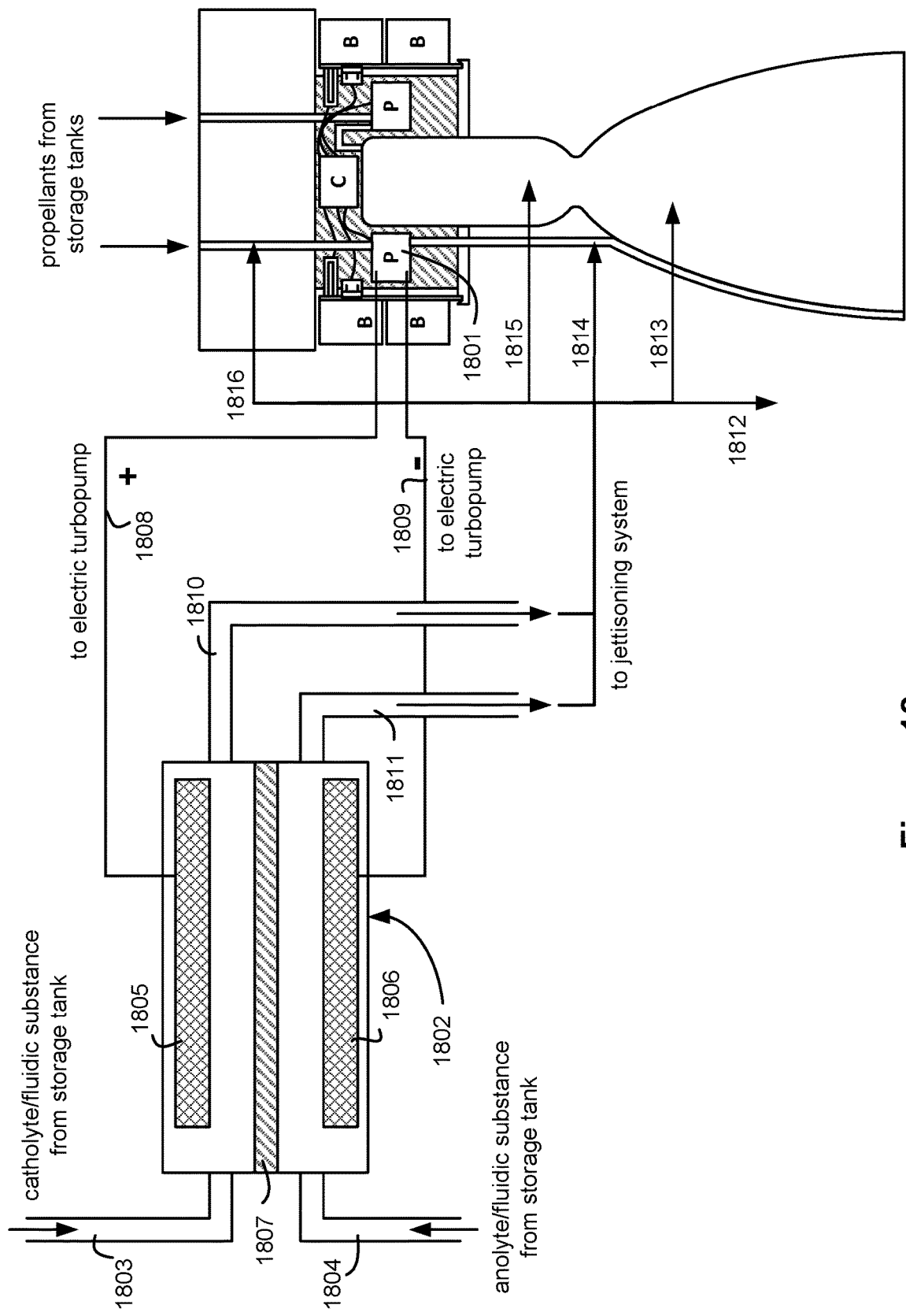
FIG. 18 shows a schematic of a flow battery featuring two fluidic components. The fluidic components, or electrolytes, are stored in two separate tanks. The fluidic components flow into the cell where they take part in an electrochemical reaction and generate electrical power for the electric turbopumps. The electrically discharged or electrochemically converted fluidic component(s) is/are then jettisoned from the vehicle, either by direct ejection from the outlet lines of the cell or by admission into the combustion chamber(s) of the rocket engine(s).

FIG. 18 presents an example of a rocket stage employing an electric turbopump 1801 powered by a flow battery 1802. The catholyte is stored in a catholyte storage tank that is connected to the battery reaction chamber (also referred to as the "cell" in this document) through a line 1803 and the anolyte is stored in an anolyte storage tank that is connected to the cell through a line 1804. The fluidic components are delivered to the cell by means of a pressure gradient between the storage tanks and the cell. This pressure gradient can be generated by gravitational forces, pressurized fuel tanks, mechanical pumps or any other means. While FIG. 18 depicts a flow battery system using two fluidic components, this disclosure also includes flow batteries using only a single fluidic component. Components that are not fluidic, but required for the electrochemical process to generate electric power, can be other structural components of the vehicle, for instance a main propellant storage tank, a baffle assembly or a propellant feed line made from a specific materials. In such cases, the electrochemical cell is no longer a distinct component as shown in FIG. 18, but a system where other components on the vehicle serve a secondary function with respect to allowing the electrochemical process to generate electric power. The fluidic component(s) for the electrochemical system can be, but do not have to be, the main propellants powering the rocket engine(s). As an example, the main propellants of the launch vehicle may include ions, thus providing a second function in which they act as the electrolytes for the flow battery system as well as the chemical energy carriers powering the combustion process in the rocket engine(s). As another example, the main propellants of the launch vehicle may also form the fluidic components required to power a fuel cell that generates the electric power for the electric turbopumps.

When the fluidic component(s) pass(es) through the cell 1802, it/they take part in the electrochemical process which provide(s) electrical power to the vehicle. Electrodes 1805 and 1806 in contact with the fluidic components accept the flow of electrons and allow electrical power to be extracted from the cell. The electrode(s) in contact with the electrolyte(s) is/are made of copper, silver or any other material typically featuring a low electrical resistance. The electrode(s) may be plated with other materials to increase its/their oxidization resistance or ability to enhance the electrochemical process by means of a catalytically active surface. If an electrode does not participate in an electrochemical reaction, it may be understood to be a "current collector." Regardless, one role of the electrodes is to "collect" current for the external circuit, which may include an electric motor for powering a turbopump.

The cell 1802 may be a membrane-less flow battery or include a membrane 1807 that separates the fluidic components from each other as shown in FIG. 18. The membrane in a typical reduction-oxidation ("redox") flow battery prevents cross-mixing of the electrolytes while allowing for the transport of ions from one electrolyte into the other thus completing the electrical circuit. Electrons leave the cell through electrodes in contact with the anolyte, also referred to as "anodes" 1806 and enter the cell through electrodes in contact with the catholyte, also referred to as "cathodes" 1805. Positively charged ions, i.e. ions that are short of electrons, flow from the anolyte through the membrane into the catholyte. Negatively charged ions, i.e. ions that carry additional electrons may alternatively or additionally flow from the catholyte through the membrane into the anolyte. The electrodes in the cell, i.e. the anode 1806 and the cathode 1805 connect the flow battery, which serves as the electric source, to electric leads 1808 and 1809. The load, here an electric turbopump 1801, is connected to the electric leads from the cell. For reasons of simplification, the schematic shown here depicts the cell as a DC source and the electric turbopump as a DC load. This disclosed is not limited to DC sources, nor is it limited to DC loads. The typical electric turbopump uses a three-phase motor design, requiring a motor controller that converts the DC signal from the source into a 3-phase signal. This motor controller is not shown in this simplified block diagram.

In certain implementations, as briefly mentioned beforehand, the electrode(s) may enhance or allow for the electrochemical discharge process by means of a catalytically active surface. A catalytically active surface is often required for a fuel cell, where a catalyst on the anode oxidizes the fuel, generating positively charged ions that move through the electrolyte/membrane to the cathode, where they combine with an oxidizer. A membrane separates the anode from the cathode, allowing protons or positively charged ions to pass through, while blocking electrons from passing, generating an electric potential difference between the two electrodes. A typical hydrogen-oxygen fuel cell is an example of the flow battery system disclosed here since hydrogen and oxygen are propellants resulting in high specific impulses.

Some liquid flow batteries may operate at temperatures different to the temperature environments typically found in launch vehicles. In such cases, the vehicle may employ appropriate cooling or heating systems, which may be integrated with other cooling or heating systems on the vehicle.

The electrically discharged or electrochemically converted fluidic component(s) 1810 and 1811 flow from the cell outlet(s) to a jettisoning system. The jettisoning system expels the fluid(s) by directly jettisoning it through one or multiple dump pipes 1812, by flowing it into the thrust nozzle or nozzle extension 1813, by flowing it into a propellant line downstream of the turbopump 1814, by flowing it directly into the combustion chamber or injector plate 1815 or by flowing it into a propellant line upstream of the turbopump 1816. Any one of these methods or a combination of these methods may be employed. The additional flow into the combustion chamber may or may not increase the thrust of the engine or provide for additional cooling. An additional pump may be used to transfer the fluidic component from the cell into the jettisoning system. The flow of the fluidic component(s) from the cell into and through the jettisoning system is established by means of pressure gradients between the cell and the line-ends of the jettisoning system. This pressure gradient can be generated by gravitational forces, pressurized tanks, mechanical pumps or any other means. Valves, which are not shown in FIG. 18 may be present in the jettisoning system to switch between the outlined jettisoning methods and/or meter between multiple jettisoning methods. As shown in FIG. 18, the electrical turbopump draws propellant from propellant tanks and delivers it to a combustion chamber of the rocket engine(s). The overall mass of the flow battery system reduces as the fluidic component(s) is/are dispensed from the vehicle. While the cell may remain with the vehicle throughout all or nearly all of the life of the rocket engine(s), the fluidic component(s) as well as other substances or components of the cell that are not fluidic are either simply ejected from the vehicle or admitted to the jettisoning system. While the fluidic components may be electrochemically discharged, they may still hold chemical energy that can be used to drive the combustion process in the rocket engine's combustion chamber(s).

Flow Battery Chemistries

The fluidic component(s) for powering the electrochemical system generate(s) an electric potential difference in the cell by releasing or consuming electrons, protons, negatively charged ions, positively charged ions, or any other particle or constructs (e.g., a hole) that can carry an electric charge. The electric potential difference is generated when the fluidic component(s) come in contact with themselves, other electrolytes, electrodes, membranes or catalysts. The electrodes, electrolytes, membranes and catalysts may be solid, liquid, gaseous or any multi-phase combination of these such as solid particles dissolved in liquid carrier substances.

Various types of flow battery systems and/or fuel cells may be employed. These can be grouped by reaction chemistry, separator/membrane design, the physical state of the fluidic component(s) or the reversibly of the electrochemical process. Among the potential battery chemistries are the typical flow battery chemistries such as zinc-bromine, zinc-chlorine, vanadium redox, iron-chromium, hydrogen-bromine and any other chemistry that features at least one fluidic component. Fuel cell designs using hydrogen and/or hydrocarbon fuels in combination with an oxidizer to generate an electric potential difference are also covered by this disclosure as long as at least one fuel is provided as a fluidic component.

As indicated, there are a large number of chemistries that can be used for flow battery systems, not all of which will be discussed here in detail. A common flow battery is the vanadium redox flow battery which uses two vanadium based liquid electrolytes, the anolyte containing V(2+) and V(3+) ions and the catholyte containing VO2(+) and VO(2+) ions. The two electrolytes are typically separated using a proton exchange membrane. When the cell is discharged, the VO2(+) ions in the catholyte are reduced to VO(2+) ions, thereby consuming electrons, while the V(2+) ions are oxidized to V(3+) ions, thereby producing electrons. The electrons in the anolyte collect at the anode, flow through the electrical device, here the electric turbopump, to the cathode into the catholyte. The cell typically operates at temperatures of about 10 to 40 degrees C., although higher operating temperatures may be used for the purpose of this application, where the rechargeability aspect is secondary. The cell voltage is about 1.4 to 1.6 volts and multiple cells can be connected in series or in parallel.

There are a large number of chemistries that can be used for single-use, non-rechargeable flow batteries where the fluidic components are irreversibly changed during the electrical discharge process. Such flow batteries are typically referred to as fuel cells and the most commonly employed fuel cell is the hydrogen fuel cell. This disclosure is not limited to hydrogen fuel cells, but includes any fuel cell that uses at least one fluidic fuel/substance for the electrochemical process in the cell. In a hydrogen fuel cell, hydrogen is oxidized using an anode with a catalyst producing electrons and protons. An electrolyte or membrane that only allows the protons to pass through separates the anode from the cathode. Protons passing through the membrane react with an oxidizer, typically oxygen, and electrons that flow from the anode through the electric device (here the electric turbopump) to the cathode, forming water or steam. The water and/or steam can be jettisoned using a dump pipe, be admitted to a combustion chamber or be expanded in a nozzle to produce additional thrust for the vehicle. The high energy efficiencies of fuel cells, often greater than 50%, make them ideal candidates for a flow battery system to power an electric turbopump system on a launch vehicle. The cell voltage of a typical fuel cell is between 0.6 and 0.7 volts and multiple cells can be connected in series or in parallel. The energy densities of fuel cells can approach the same order of magnitude than that of rocket propellants such as liquid oxygen and kerosene, which is about 10 MJ/kg.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower," or "vertical" and "horizontal," are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

The invention claimed is:

1. An apparatus comprising:
a rocket engine system comprising:
one or more rocket engines;
a turbopump including an impeller and an electric motor configured to rotate the impeller and configured to supply propellant to at least one of the rocket engines;
a set of battery units grouped into a plurality of different proper subsets of the battery units, the proper subsets of the battery units configured to power the electric motor of the electric turbopump in parallel with one another;
a ledge;
a plurality of sets of one or more battery jettison mechanisms, each set of the one or more battery jettison mechanisms configured to independently jettison a different one of the proper subsets of the battery units from the rocket engine system; and
a controller, the controller communicatively connected with each of the one or more battery jettison mechanisms and configured to control the one or more battery jettison mechanisms to jettison at least one of the proper subsets of the battery units during flight of a launch vehicle in which the rocket engine system is installed or within which the rocket engine system is configured to be installed, wherein:
the one or more proper subsets of the battery units includes a first proper subset of the battery units,
the set of one or more battery jettison mechanisms that is configured to jettison the first proper subset of the battery units includes a first battery jettison mechanism,
the first proper subset of the battery units includes a structure or is attached to a structure that has a first edge that is supported by the ledge,
the launch vehicle in which the rocket engine system is installed or in which the rocket engine system is configured to be installed has an aft end and a forward end, and
the ledge is positioned so as to be closer to the aft end of the launch vehicle, when the rocket engine system is installed in the launch vehicle, than the first battery jettison mechanism.

2. The apparatus of claim 1, further comprising a framework that supports the proper subsets of battery units in an array centered on a first axis that, when the rocket engine system is installed on the launch vehicle, aligns with a center axis of the launch vehicle.

3. The apparatus of claim 2, wherein the framework supports the proper subsets of the battery units such that the proper subsets of the battery units are within an envelope of the launch vehicle surrounding some or all of the one or more rocket engines when the rocket engine system is installed in the launch vehicle.

4. The apparatus of claim 3, further comprising the launch vehicle, wherein:
the rocket engine system is installed in the launch vehicle,
the launch vehicle includes a fairing having one or more cylindrical or conical sections, and
the envelope represents a cylindrical or conical volume having an outer boundary that is coincident with an outer surface of the cylindrical or conical section of the fairing that is closest to the rocket engine system.

5. The apparatus of claim 3, further comprising the launch vehicle, wherein:
the rocket engine system is installed in the launch vehicle,
the launch vehicle includes a fairing having one or more cylindrical or conical sections,
the fairing includes a first cylindrical section,
the first cylindrical section is the section of the one or more cylindrical or conical sections that is closest to the rocket engine system, and
the proper subsets of the battery units are all located within a cylindrical volume that has the same diameter and center axis as the first cylindrical section.

6. The apparatus of claim 1, wherein:
each rocket engine includes a combustion chamber and a thrust nozzle, and
for each of the sets of one or more battery jettison mechanisms:
  that set of one or more battery jettison mechanisms includes at least two battery jettison mechanisms and includes a corresponding first battery jettison mechanism and a corresponding second battery jettison mechanism,
  the proper subset of the battery units for that set of two or more battery jettison mechanisms has a top end and a bottom end,
  the first battery jettison mechanism for that set of two or more battery jettison mechanisms is positioned closer to the top end of the proper subset of the battery units for that set of two or more battery jettison mechanisms than the second battery jettison mechanism for that set of two or more battery jettison mechanisms, and
  the battery jettison mechanisms for that set of two or more battery jettison mechanisms are configured to jettison the proper subset of the battery units for that set of two or more battery jettison mechanisms such that the proper subset of the battery units for that set of two or more battery jettison mechanisms clears the thrust nozzle and/or other components of the rocket engine system when the rocket engine system is installed in the launch vehicle, the launch vehicle is in flight, and that set of two or more battery jettison mechanisms is actuated.

7. The apparatus of claim 6, wherein:
the set of two or more battery jettison mechanisms for each proper subset of the battery units is configured to jettison that proper subset of the battery units such that one of the top end and the bottom end of that proper subset of the battery units experiences a higher velocity during the release as compared to the other end of that proper subset of the battery units such that that proper subset of the battery units rotates after release.

8. The apparatus of claim 1, wherein the controller is also communicatively connected with the battery units and is further configured to:
monitor a parameter selected from the group consisting of: remaining battery capacity and battery health of each proper subset of the battery units,
determine, at a first time, that the parameter of a first proper subset of the proper subsets of the battery units indicates a condition selected from the group consisting of: that the first proper subset of the battery units is no longer needed in order to provide sufficient electrical energy to power the electric motor of the turbopump for the remaining duration of the launch vehicle flight and that the battery health of the first proper subset of the battery units is degraded, and
control the set of one or more battery jettison mechanisms that is configured to jettison the first proper subset of the battery units to jettison the first proper subset of the battery units responsive, at least in part, to a determination that the remaining battery capacity of the first proper subset of the battery units is no longer needed in order to provide sufficient electrical energy to power the electric motor of the turbopump for the remaining duration of the launch vehicle flight or to a determination that the battery health of the first proper subset of the battery units is degraded.

9. The apparatus of claim 8, wherein the parameter of the battery health of each proper subset battery units is a temperature of each subset battery units.

10. The apparatus of claim 8, wherein the parameter is a voltage of each proper subset battery unit.

11. The apparatus of claim 8, further comprising a timer configured to indicate an amount of time from burn initiation, and the controller is communicatively connected with the timer and is further configured to determine the sufficient electrical energy to power the electric motor of the turbopump for the remaining duration of the launch vehicle flight by referencing the time from burn initiation.

12. The apparatus of claim 8, further comprising a sensor configured to indicate the remaining amount of propellant, and the controller is communicatively connected with the sensor and is further configured to determine the sufficient electrical energy to power the electric motor of the turbopump for the remaining duration of the launch vehicle flight by referencing the remaining the amount of propellant and calculating the maximum power budget needed for the remaining amount of propellant.

13. The apparatus of claim 8, further comprising a navigation system with a guidance system configured to indicate the rocket engine system's state vectors and provide the rocket engine system's target state vectors, and the controller is communicatively connected with the navigation system and is further configured to determine the sufficient electrical energy to power the electric motor of the turbopump for the remaining duration of the launch vehicle flight by calculating the power needed to move the rocket engine system's target vectors to the target state vectors.

14. The apparatus of claim 8, wherein the controller is further configured to:
monitor both the remaining battery capacity and the battery health of each proper subset of the battery units,
determine if the battery health of the first proper subset of the battery units is degraded,
determine if the first proper subset of the battery units is no longer needed in order to provide sufficient electrical energy to power the electric motor of the turbopump for the remaining duration of the launch vehicle flight,
control the set of one or more battery jettison mechanisms that is configured to jettison the first proper subset of the battery units to jettison the first proper subset of the battery units responsive, at least in part, to a determination that the battery health of the first proper subset of the battery units is degraded, and
control the set of one or more battery jettison mechanisms that is configured to jettison the first proper subset of the battery units to jettison the first proper subset of the battery units responsive, at least in part, to a determination that the remaining battery capacity of the first proper subset of the battery units is no longer needed in order to provide sufficient electrical energy to power the electric motor of the turbopump for the remaining duration of the launch vehicle flight.

15. The apparatus of claim 14, further comprising a timer configured to indicate an amount of time from burn initiation, wherein the controller is further configured to:
determine if the first proper subset of the battery units is no longer needed in order to provide sufficient electrical energy to power the electric motor of the turbopump for the remaining duration of the launch vehicle flight by referencing the time from burn initiation, and
determine if the battery health of the first proper subset of the battery units is degraded by referencing a temperature of the first proper subset of the battery units.

16. The apparatus of claim 1, wherein at least one of the battery jettison mechanisms includes a device selected from the group consisting of: a piston, a plunger, a pyrotechnic actuator, a frangible bolt, a frangible nut, and a latch.

17. The apparatus of claim 1, wherein at least one of the battery jettison mechanisms includes a piston.

18. The apparatus of claim 1, wherein the proper subsets are arranged in a circular array.

19. The apparatus of claim 1, wherein the proper subsets of the battery units include a first proper subset of the battery units and the controller is also communicatively connected with a temperature sensor configured to measure a temperature of the first proper subset of the battery units and is further configured to:
- monitor a temperature of the first proper subset of the battery units,
- determine that the temperature of the first proper subset of the battery units meets at least one or more criteria selected from the group consisting of: exceeding a first threshold temperature and exhibiting abnormal temperature fluctuations, and
- control, responsive to determining that the temperature of the first proper subset of the battery units meets the at least one or more criteria, the set of one or more battery jettison mechanisms that is configured to jettison the first proper subset of the battery units to jettison the first proper subset of the battery units.

* * * * *